United States Patent
Finke

(10) Patent No.: US 6,338,227 B1
(45) Date of Patent: Jan. 15, 2002

(54) LIGHT ALLOY FRAME PROFILE SYSTEM FOR DOORS AND WINDOWS

(75) Inventor: Andreas Finke, Gevelsberg (DE)

(73) Assignee: Dorma GmbH + Co. KG, Ennepetal (DE)

(*) Notice: Subject to any disclaimer, the term of this patent is extended or adjusted under 35 U.S.C. 154(b) by 0 days.

(21) Appl. No.: 09/454,422

(22) Filed: Dec. 3, 1999

(30) Foreign Application Priority Data

| Dec. 4, 1998 | (DE) | 198 56 040 |
|---|---|---|
| Dec. 4, 1998 | (DE) | 198 56 042 |
| Dec. 4, 1998 | (DE) | 198 56 232 |
| Dec. 4, 1998 | (DE) | 198 55 854 |
| Dec. 4, 1998 | (DE) | 298 21 561 U |

(51) Int. Cl.$^7$ ............................................. E06B 1/04
(52) U.S. Cl. ............. 52/207; 52/204.51; 52/238.1; 52/204.62; 52/204.67; 52/204.68; 52/204.7; 49/504; 49/501
(58) Field of Search ............. 49/504, 501; 52/207, 52/204.51, 238.1, 730.3, 656.4, 204.62, 204.67, 204.68, 204.69, 204.7, 656.5, 656.2

(56) References Cited

U.S. PATENT DOCUMENTS

| 3,040,847 A | * | 6/1962 | Webster ..................... 52/656 |
| 3,061,055 A |   | 10/1962 | Nijhuis |
| 3,081,849 A | * | 3/1963 | Hubbard ..................... 52/656 |
| 3,354,581 A |   | 11/1967 | Dimmitt et al. |
| 3,436,885 A | * | 4/1969 | Rothermel ................... 52/235 |
| 3,828,516 A |   | 8/1974 | Kern |
| 3,834,081 A |   | 9/1974 | Catlett |
| 3,859,754 A | * | 1/1975 | Budich et al. ................ 40/425 |
| 3,886,684 A |   | 6/1975 | Sheckells |
| 3,887,050 A |   | 6/1975 | Sheckells |
| 3,897,651 A |   | 8/1975 | Sheckells |
| 4,063,388 A |   | 12/1977 | Little |
| 4,251,964 A | * | 2/1981 | Francis ....................... 52/282 |
| 4,553,367 A | * | 11/1985 | Redien ........................ 52/656 |
| 4,573,287 A | * | 3/1986 | Hagemeyer et al. .......... 49/381 |
| 4,850,168 A | * | 7/1989 | Thorn ......................... 52/207 |
| 5,199,236 A | * | 4/1993 | Allen .......................... 52/235 |
| 6,192,643 B1 | * | 2/2001 | Zadok ....................... 52/648.1 |

FOREIGN PATENT DOCUMENTS

| AT | 378231 | 7/1985 |
| DE | 23722 | 11/1905 |
| DE | 1853347 | 6/1962 |

(List continued on next page.)

OTHER PUBLICATIONS

Publication, Bauelemente Der Feinmechanik, F. Kozer, Veb Verlag Technik Berlin 1959, pp. 273–274.

Catalog excerpts—Bauelemente aus Aluminium.

Publication, Feinmechanische Bauelemente, Prof. Dr.–Ing. Siegfried Hildebrand, 1978, pp. 226–227.

Catalog excerpt—Wichtige Konstruktionspunkte und Merkmale.

Primary Examiner—Beth A. Stephan
Assistant Examiner—Dennis L. Dorsey
(74) Attorney, Agent, or Firm—Nils H. Ljungman & Associates

(57) ABSTRACT

A light alloy frame profile system for windows and doors, in particular sliding-swinging door systems with a side piece and at least one movable door leaf, includes a plurality of profiles that are fixed to one another by means of fastening areas. To improve such a frame profile system so that it is substantially aesthetically and functionally uniform, and so that it may be used with simple and material-conserving fabrication methods as well as uniform installation techniques, the fastening area may be realized in the form of a rail that is formed by two hooks and a projection located between them.

16 Claims, 26 Drawing Sheets

FOREIGN PATENT DOCUMENTS

| | | |
|---|---|---|
| DE | 2422280 | 6/1975 |
| DE | 2842826 | 4/1980 |
| DE | 3411668 | 10/1984 |
| DE | 3743041 | 7/1988 |
| DE | 4108547 | 6/1992 |
| DE | 9204636 | 6/1992 |
| DE | 4201510 | 7/1992 |
| DE | 4422454 | 1/1996 |
| DE | 19522044 | 12/1996 |
| EP | 0565492 | 10/1993 |
| EP | 0554438 | 4/1996 |
| EP | 0867593 | 9/1998 |
| GB | 2238332 | 5/1991 |

\* cited by examiner

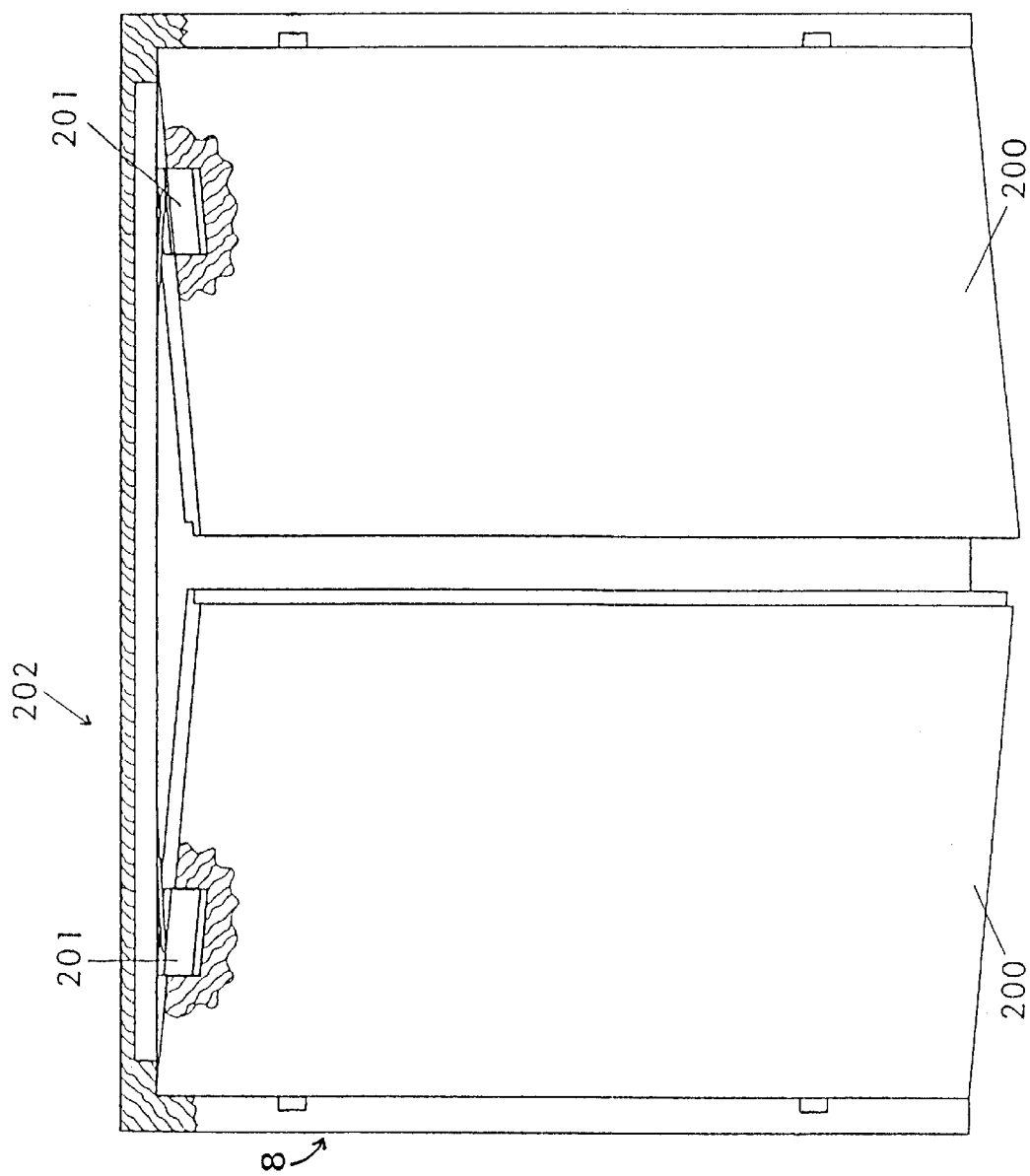

LIGHT ALLOY FRAME PROFILE SYSTEM FOR DOORS AND WINDOWS

BACKGROUND OF THE INVENTION

1. Field of the Invention

The present invention relates to a light alloy frame profile system. Such light alloy frame profile systems are used for doors, windows and in particular for automatic door systems, and include a plurality of profiles that are fastened to one another by means of fastening areas. On such systems, the door leaves and the side pieces, if any, can pivot outward if necessary, so that the passage width can be doubled without having to unlock any type of lock. A profile of the side piece is thereby located in a stationary fashion on a floor profile that is fastened on the floor side, while the floor guide device that consists of a mounting and a roller is fastened to a profile of the door leaf. The individual profiles abut one another perpendicularly and are fastened to one another by means of corresponding profile connectors.

2. Background Information

A similar door system is described in German Utility Model DE 92 04 636 U1. The profile system described in this publication is composed of a number of different individual profiles. On account of the different configurations of the connecting areas, the connection of the individual profiles requires detailed and extensive installation know-how. The assembly and installation process is accordingly never the same twice and is very time-consuming. A number of different tools and tool applications are required for the fabrication process.

Additional frame profile systems are described in GB 2 238 322 A and European Patent document 0 565 492 A2. The structures of the individual profiles are extremely complex and material-intensive, as a result of which the fabrication process is correspondingly complex, expensive and time-consuming. Moreover, different connections between the individual profiles are required within each individual system.

European 0554 438 B1 also describes doors that are mounted so that they can pivot. In this case, the doors are mounted by means of an upper and lower support arm on a continuous vertical shaft. One disadvantage of this design is that the force is transmitted to the structure in individual points. The loads that occur are absorbed by the solid configuration of the shaft, which means that a great deal of material must be used, which significantly increases the weight of the door system. The visible and exposed shaft also has an undesirable effect on the appearance of the door and takes up a great deal of space. German Laid Open Patent Application No. 24 22 280 describes a similar door system.

U.S. Pat. No. 3,886,684 and U.S. Pat. No. 3,887,050 describe door leaves that can be pivoted inside a revolving door and are located on a central shaft. The individual leaves are fastened to the shaft by means of rings. To pivot the doors, the rings, which are pressed against the shaft and fastened by means of a spring force, are pushed out of their normal position. The leaves are displaced by means of a spot load applied by means of the rings. The leaf or its frame is consequently subjected to a non-uniform application of the load.

U.S. Pat. No. 3,834,081 describes a light alloy frame profile system whereby the leaf is mounted on the ceiling side by means of a support profile and a truck in a rail so that it can be displaced parallel to the stationary side piece. On the floor side, a guide roller which is located on the door leaf is engaged with a profile of the side piece. The side piece is fastened to a floor profile on the floor. A pivoting device between the support profile and the leaf makes it possible to pivot the leaf. The guide roller makes possible a floor-side pivoting of the leaf. The installation of the floor profile is extremely complex and time-consuming, because there is no direct reference point for the side piece that must be subsequently installed and its correct positioning. Consequently, a repeated verification of the positioning in relation to the side piece is necessary to guarantee the correct and long-term operation of the door system. Moreover, the transverse loads that act on the leaf are transmitted directly via the guide roller to the side piece. For example, the interface between the side piece and the floor profile must be subjected to a particularly heavy load to push the side piece out of the floor anchoring.

European Patent document 0 867 593 A2 describes a rail or butt joint connector that can be fastened to a first profile without the need for screws or bolts. The profile connector is realized with a pair of elastic arms, so that it snaps frontally into a rail of the first profile and can be displaced in the rail. The second profile, which is reverse drawn over the profile connector, simultaneously causes a spreading of the arms, so that the profile connector is clamped in the rail of the first profile. This clamping fastening of the profile connector, in particular on heavy door systems, does not guarantee a sufficient frictional connection to prevent subsequent slipping. It is particularly difficult to guarantee uniform elasticity characteristics over the life of such profile connectors.

OBJECT OF THE INVENTION

An object of the present invention is therefore to improve a frame profile system of the type described in claim 1 so that it is substantially aesthetically and functionally uniform and so that it is possible to use in conjunction with the present invention substantially simple fabrication processes that do not waste material as well as substantially uniform installation procedures.

SUMMARY OF THE INVENTION

The present invention teaches that this object can be accomplished by the features disclosed in of claim 1. The subclaims disclose advantageous refinements of the object of claim 1.

The object of claim 1 has the advantage that it creates a substantially uniform principle for the connection of profiles. A dovetail-shaped projection is realized inside a rail, in one piece with said rail, on at least one profile that defines an external side, so that the corresponding matching profile can be easily and positively inserted or inserted with a form-fit or clamped to it. This connection principle has been realized consistently over the entire frame profile system, to guarantee a substantially easy and uniform assembly. A number of different profiles can be fastened to one another, such as support profiles, interlocking profiles, leaf profiles, glass strips, profile connectors, etc. An additional advantage results from the substantially uniform receptacle chambers for seals and gaskets.

On account of the substantially simple construction and the substantial uniformity of the fastening areas, additional advantages can be achieved in terms of ease of manufacture, because the same tools and tool parts can be used for these profile segments.

The substantially simple construction of the profiles can result in a reduced requirement for material and simplifies the shaping process, because simpler tool shapes can be used. The realization of substantially identical profile segments can thereby reduce the construction costs for the tools and dies. The structures of the profiles are nevertheless sufficiently stable to withstand the loads that are customarily exerted on a door system, for example. When the profiles are being assembled, the same assembly techniques and tools can be used on account of the substantially uniform profile segments.

The substantially small amount of material required and above all the use of conventional materials can reduce the procurement costs and can reduce the overall weight. At the same time, on account of the advantageous construction, the number of individual parts required is substantially minimized, so that the fabrication expense is essentially low and the assembly into a profile system is significantly simplified.

The connection principle essentially guarantees a substantially simple and substantially uniform assembly process. Above all, the substantially symmetrical construction of the profile connector and the substantially consistent connection principle make possible essentially low fabrication costs, because the only dimension of the profile connector that needs to be adapted is its length; no changes in shape are necessary. Fabrication tolerances in the transverse direction between a fastening rail on a first profile and a fastening base on the profile connector are substantially equalized by a centering device, so that the second profile to be installed comes into essentially correct contact with the first profile. The profile connector is invisible from the outside, and none or essentially none of the functions of the door system are adversely affected. An installation device facilitates the fastening of the profile connector between the profiles.

Simultaneously, the well-established characteristics regarding the uniform distribution of force and the effective mounting have been retained. It is also possible to change the orientation of the door leaf at any time with regard to its position in the supporting profile.

The displacement of the mounting into the connecting point between the shaft and the support arm and the direct and non-rotational fastening of the shaft in a profile realized in one piece significantly facilitates the installation and any maintenance that may be necessary. The essential components of the pivot mounting, namely the support arm and the shaft, are separable and can therefore be replaced individually. The use of gray cast iron material containing graphite for the support arm and steel for the shaft makes the components substantially economical to design and manufacture. In particular, as a result of the use of the gray cast iron material, the necessary requirements regarding friction properties and the ability to withstand high temperatures are substantially met, so that the correct operation of the pivot mounting is essentially guaranteed when the support arm and the shaft are in direct contact. The shaft is preferably not machined further after its original shaping process.

Optionally, an additional bearing bush can be used to realize a particularly smooth-running bearing. In this case, the bearing bush is made of a special material. Material is removed from the bearing boring in the support arm so that after the insertion of the bearing bush, the other components of the pivot mounting can be re-used without any or with only minor modifications. The bearing bush is non-detachably fixed in position in the bearing boring, e.g. by means of assembling work or press-fitting.

The shaft is inserted into the bearing boring of the support arm, and with the interposition of a ring-shaped disc is held on the bearing-side shaft end in the support arm by means of a retaining ring. The ring-shaped disc makes it possible for the shaft to rotate essentially without resistance in the bore of the bearing. The solid shaft is penetrated by a plurality of parallel threaded borings which, after the shaft has been inserted into the profile, are aligned with borings in the profile, so that, by means of screws, the profile and the shaft can then be non-positively fastened to each other. The introduction and centering of the shaft in the profile is facilitated by an inner wall that surrounds the shaft at least partly in a form-fitting or positive manner.

The support arm is inserted or positively inserted into the support profile and is retained by means of screws through a slot on the underside of the support profile. For this purpose, the screws are screwed through threaded borings in the support arm inside the support profile against the upper side of the support profile, so that the support arm is pressed and thus held in position by its form-fit or positive connection with the support profile against the underside of the support profile. Adjustment means are also located underneath the free end of the support arm, so that the leaf can be adjusted with respect to the support profile, in particular after the installation of the glass and the resulting increase in weight.

The installation of the side piece is further simplified because only one component is required to fasten the side piece to the floor and to simultaneously realize the guidance of the leaf on the side piece. A floor profile is pre-assembled at the factory in the transverse profile of the side piece, so that for the final installation on site, the side piece needs to be positioned only once, and can then be immediately fastened in this position. The guide roller on the transverse profile of the leaf can then be introduced into the floor profile from the side. The door system can therefore be quickly and easily installed in this area. The essentially necessary functional characteristics, namely the pushing and optionally the pivoting of the door leaf, remain substantially unrestricted. The movements also become even more stable as a result of the fact that the mechanical loads applied during the pushing or pivoting are absorbed essentially exclusively in the floor profile, which is substantially stable and surrounds the guide roller in a form-fitting or positive manner. Only substantially small loads are exerted on the sensitive connecting points of the side piece.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to a number of exemplary embodiments that are illustrated in the accompanying figures, in which:

FIG. 32 is a head-on view of a sliding-swinging door system.

DESCRIPTION OF THE PREFERRED EMBODIMENT

The same reference numbers are used to identify identical or equivalent components in the different figures. The profiles described below can be used in any desired applications, e.g. for manual or automatic window/door systems.

Figure 1:
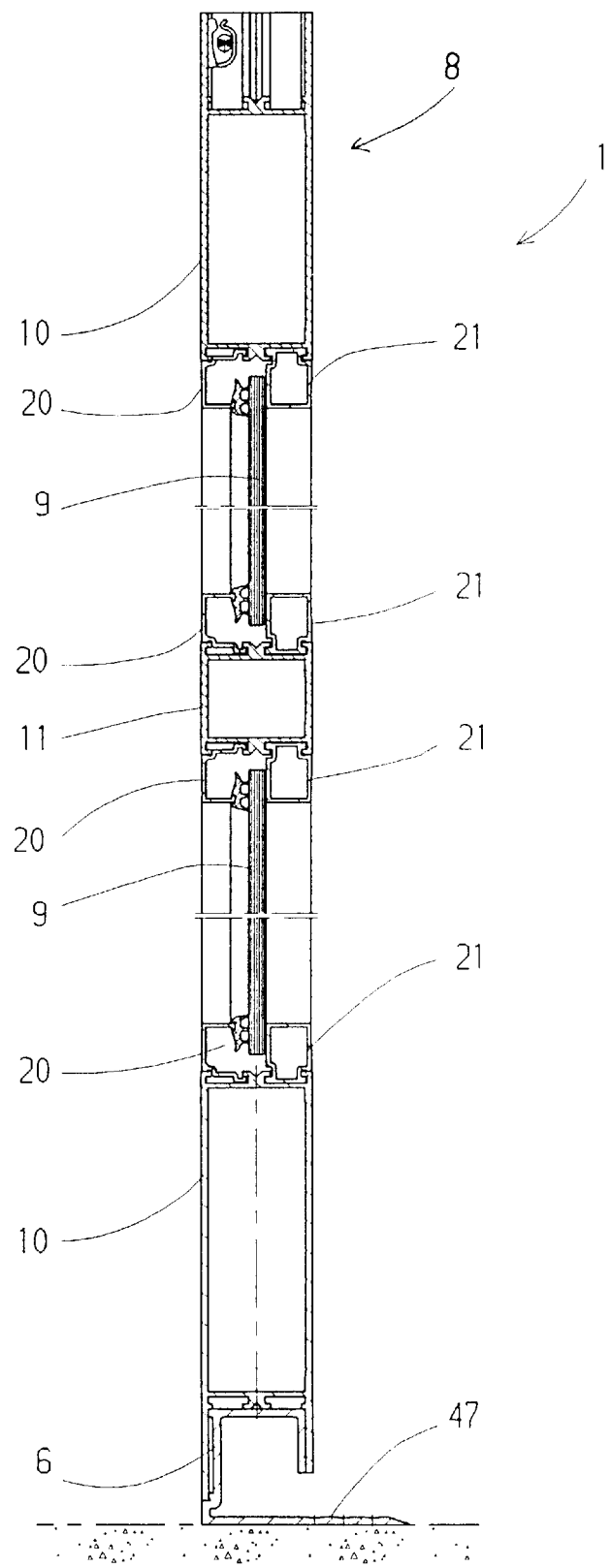
FIG. 1 is a longitudinal section through a stationary side piece of a door system.
Figure 2:
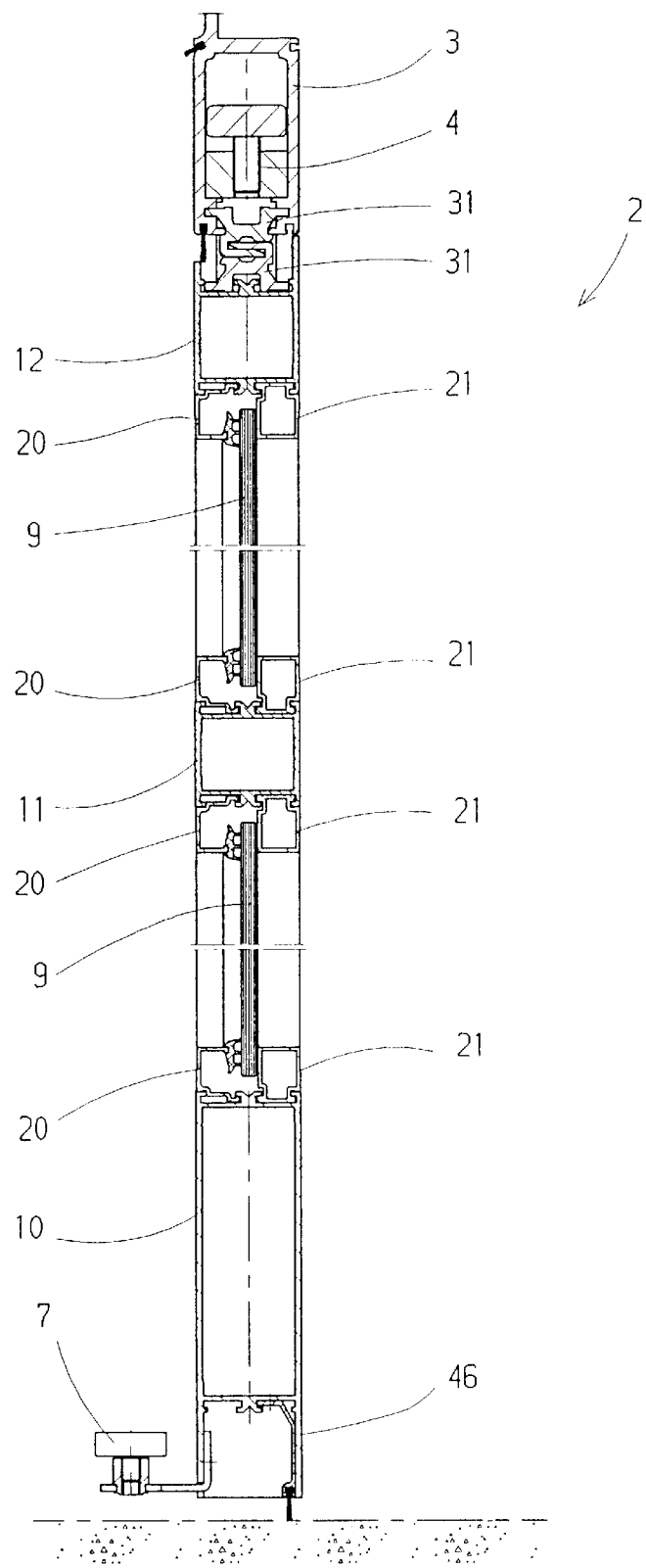
FIG. 2 is a longitudinal section through a movable leaf of a door system.
Figure 3:
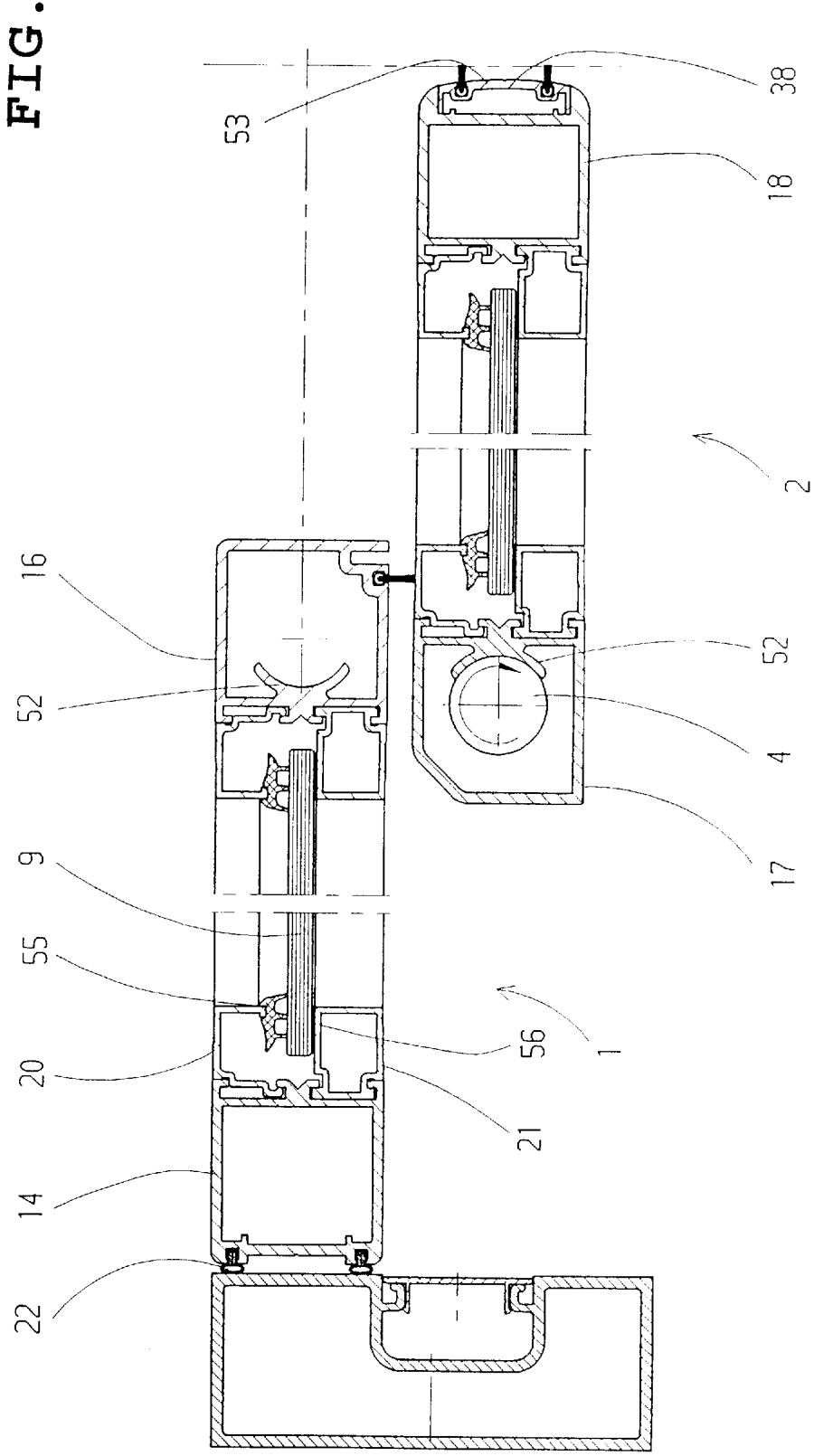
FIG. 3 is a cross section through a sliding-swinging door system.

FIGS. 1 to 3, for example, show longitudinal and cross sections of a stationary side piece 1 and a stationary leaf 2 of a glazed sliding-swinging door system. In normal operation, the side piece 1 is stationary and the leaf 2 is installed so that it can be pushed from the outside or the inside. In an emergency, the leaf 2 can be pivoted by the application of mechanical pressure to create an enlarged opening width. The leaf 2 is movably guided so that it can move parallel to the side piece 1 by means of trucks (not shown) in a rail that is mounted on the ceiling of the building. A support profile 3 fastened to the truck contains a pivot mounting 4 on which the leaf 2 is mounted so that it can pivot. To prevent a pivoting of the leaf 2 in normal operation, the leaf 2 is detachably locked to the support profile 3. On the floor side, the leaf 2 is guided by means of a coupled roller 7 in a floor profile 6 that interacts with the side piece 1.

The side piece 1 and the leaf 2 can each be made, for example, of an encircling frame 8 that is divided transversely in the middle, and corresponding glass panes 9. The profiles 10–12 have essentially the same cross section shape and in this exemplary embodiment are used as horizontal profiles between vertically oriented profiles 14–18. The profiles 10 to 12 are fastened by means of inserted profile connectors 13 at the butt joints between the profiles 14 to 18. The glass panes 9 are each held between glass moldings 20 and glass moldings 21 on the profiles 10 to 12 and profiles 14 to 18. The sealing of the swinging-sliding door system against external influences, such as wind or rain, for example, is installed at the corresponding points between the side piece 1 and the leaf 2, and with respect to the building walls by means of the seals or gaskets 22, e.g. brush seals or hose seals located on the profiles.

Figure 4:
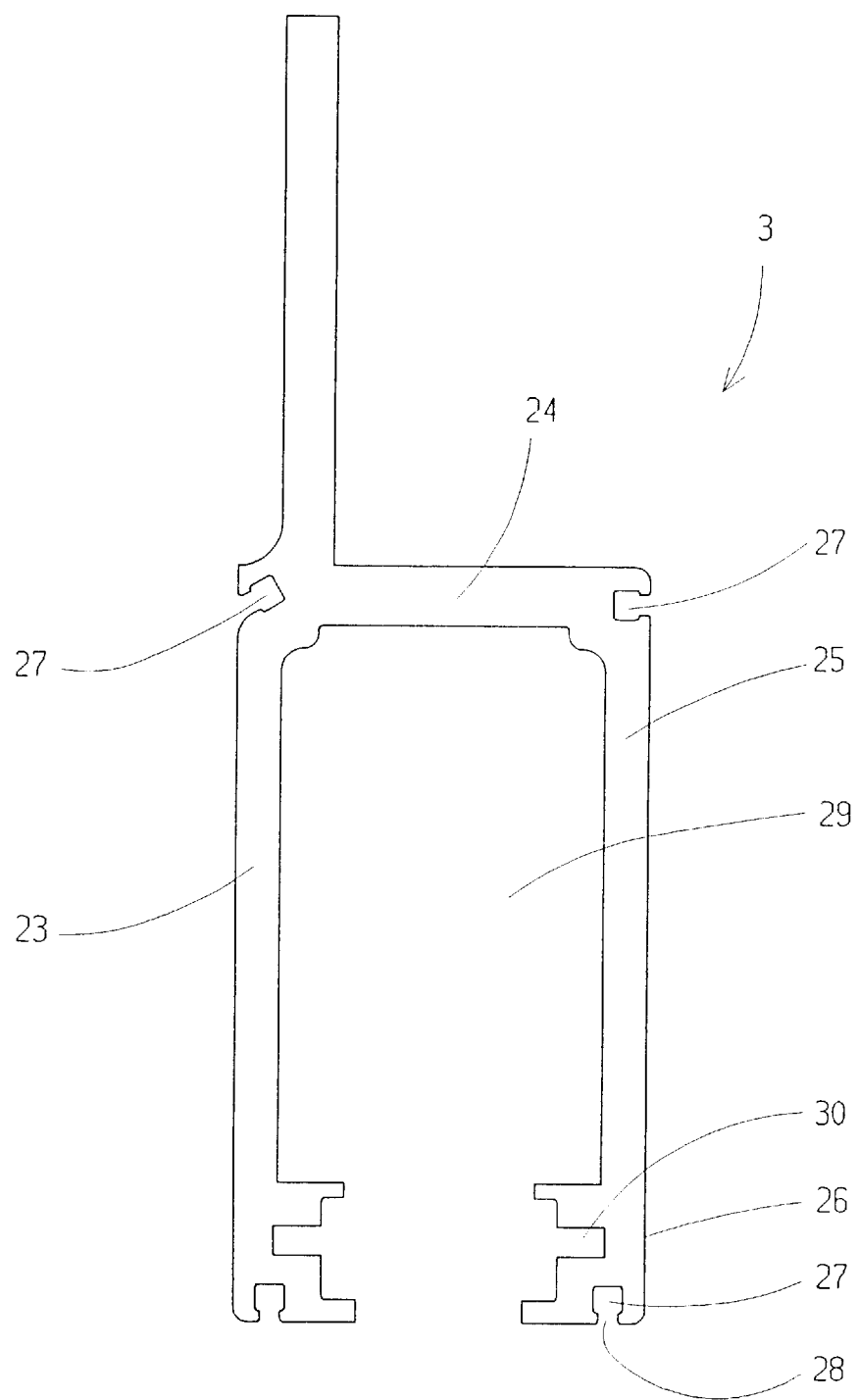
FIG. 4 is a cross section through a support profile as illustrated in FIGS. 1 to 3.

The individual profiles are described below. These profiles are generally made of a light alloy metal such as aluminum, whereby if necessary, the surface can be machined and/or coated, e.g. anodized. FIG. 4 shows the support profile 3 which creates the connection between the truck and the leaf 2. The profile 17 of the leaf 2 is thereby fastened to a pivot mount 4 located in the support profile 3. If necessary, this pivot mount 4 makes it possible for the leaf 2 to pivot. The support profile 3 has an H- shaped cross section, whereby in the center of the left-hand longitudinal leg 23 in FIG. 4, between a transverse leg 24 and a right-hand longitudinal leg 25, and on the lower ends 26 of both longitudinal legs 23, 25 there are individual receptacle chambers 27 for a seal 22. The seal 22 is inserted laterally, and projects out of the receptacle chamber 27 at a slot-shaped contraction 28. The introduction of the seal 22 is facilitated by rounded edges. The support profile 3 is always fabricated with all the receptacle chamber 27 so that it can be used in all applications. Gaskets can then be installed in the receptacle chambers 27 as necessary. The receptacle chambers 27 are also realized in the form described here in other profiles. The cavity 29 formed between the transverse leg 24 and the longitudinal legs 23, 25, to hold the pivot mount 4 among other things, is substantially restricted with respect to the transverse leg 24 on the thickened inside ends 26 of the longitudinal legs 23, 25 by inwardly directed, stepped grooves 30 for the insertion of a interlocking profile 31.

Figure 5:
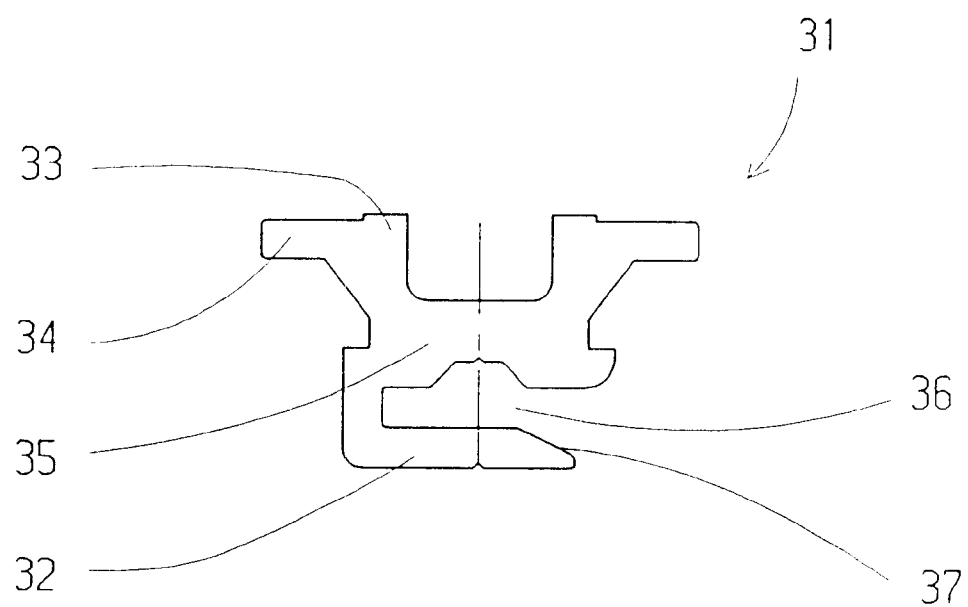
FIG. 5 is a cross section through an interlocking profile as illustrated in FIGS. 1 to 3.

FIG. 5 shows the interlocking profile 31 with a locking hook 32 that is realized in one piece with the profile. The interlocking profile 31 has a U-shaped cross section, whereby its two legs 33 have outwardly projecting steps 34 which, during the insertion into the support profile 3, are positively guided or guided in a form-fitting manner in the stepped grooves 30. The locking hook 32 is realized on the outside, on a base 35 of the interlocking profile 31. A space 36 between the locking hook 32 and the base 35 is substantially rectangular, and expands in a substantially rhomboidal shape in the base 35. A substantially identical interlocking profile 31, which is located substantially centrically symmetrically to the other interlocking profile 31 on the profile 10 of the leaf 2, interacts with the interlocking profile 31 on the support profile 3, so that the leaf 2 can be preferably pivoted in only one direction. The connection of the two locking hooks 32 is facilitated by insertion bevels 37. The interlocking profile 31 extends only into the vicinity of a main closing edge 38 of the leaf 2, and in addition to the pivot mount 4, represents a second mounting point for the leaf 2 on the support profile 3. The interlocking profile 31 can also be restrained by means of screws (not shown) which are guided through the profile 31 and interact with non-rotational washers that are located in the support profile 3.

Figure 6:
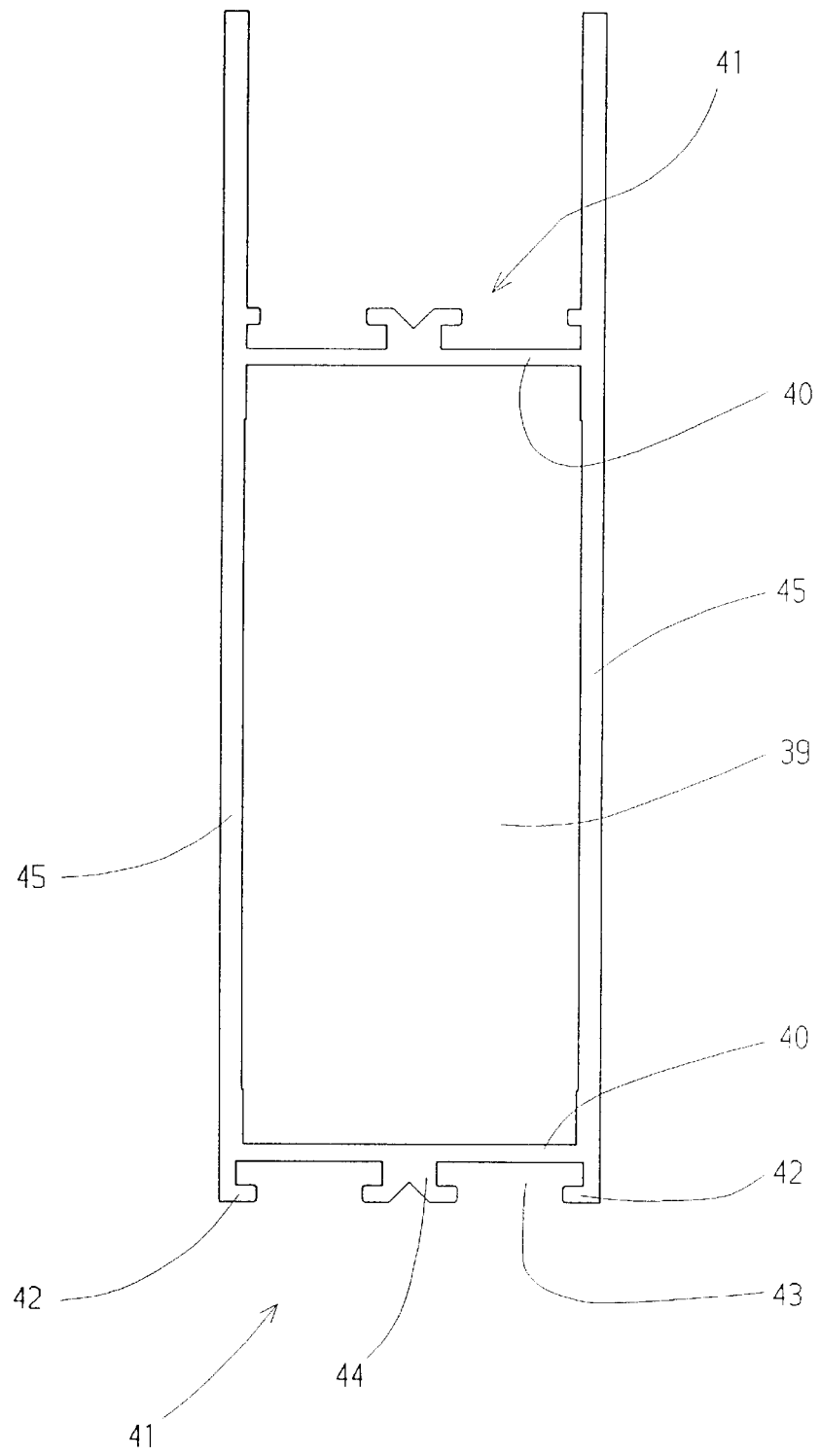
FIG. 6 is a cross section through a profile as illustrated in FIGS. 1 to 3.
Figure 7:
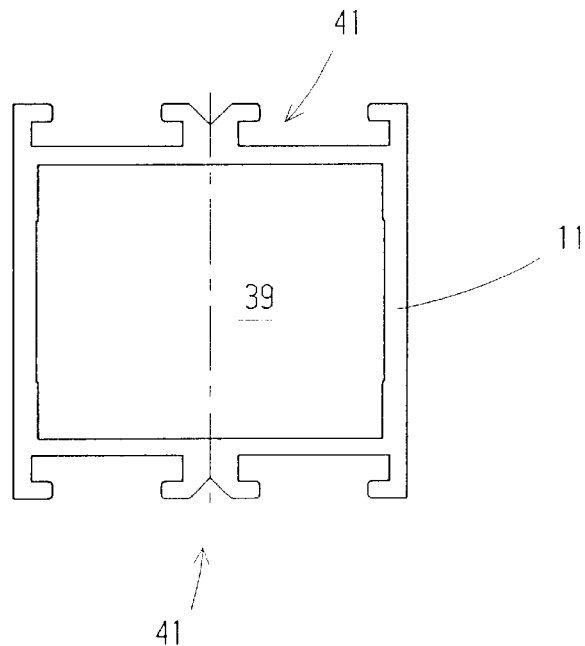
FIG. 7 is a cross section through an additional profile as illustrated in FIGS. 1 to 3.
Figure 8:
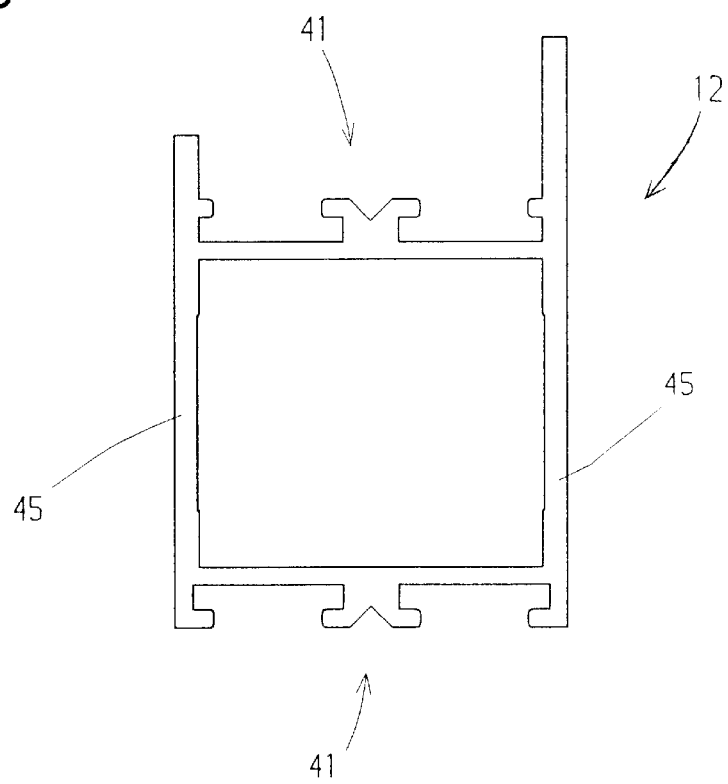
FIG. 8 is a cross section through an additional profile as illustrated in FIGS. 1 to 3.

A frame 8 of the side piece 1 and of the leaf 2 includes, among other things, profiles 10 to 12, which are realized so that they are essentially identical. As shown in FIG. 6, such a profile 10 has a substantially rectangular hollow body 39 which, on the outside, on each of the two opposite transverse sides 40, has fastening areas 41 for additional profiles. Two inwardly directed hooks 42, together with the respective transverse side 40, form a rail 43, in the center of which a dovetail-shaped projection 44 projects from the transverse side 40. This fastening area 41 represents a typical feature of the overall frame profile system. On various other profiles of the frame 8, the fastening area 41 can also be realized in a slightly modified fashion, if necessary. On the two longitudinal sides 45 of the profile 10, as shown in FIG. 6, these long sides 45 are extended beyond the hooks 42 of the fastening area 41, to cover or overlap the profiles to be fastened. The profile 10 illustrated in FIG. 6 is used as the bottom and top profile 10 of the side piece 1, and as the bottom profile 10 of the leaf 2. FIG. 7 shows a slightly modified form of the profile 11, whereby its hollow body 39 has a substantially square cross section and two opposite fastening areas 41. This profile 11 is located in the middle of two door elements, and as an additional variant (FIG. 8) with long sides 45 extended unevenly on one side as the top profile 12 of the door leaf 2.

Figure 9:
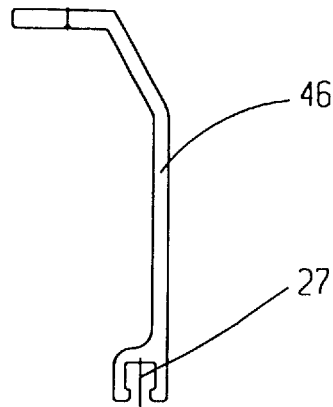
FIG. 9 is a cross section through an angle profile as illustrated in FIGS. 1 to 3.

The interaction of the profiles is described below. The top profile 10 of the side piece 1 is fastened on the outside to the rail of the leaf 2, whereby the elongated long sides 45 cover fastening pins, which are not shown in any greater detail. The complementary or mating interlocking profile 31 is inserted into the top profile 12 of the leaf 2. The long sides 45 of the profile 12 cover the interlocking profile 31, whereby the shorter long side 45 interacts with a seal 22 of the support profile 3. Snapped into the bottom profile 10 of the leaf 2 is an angle profile 46 (FIG. 9), which grips or partly surrounds the projection 44 in the fastening area 41 on one side, and is then pivoted so that it is clamped against the long side 45. The angle profile 46 is realized on the floor side with the receptacle chamber 27 for a seal 22.

Figure 10:
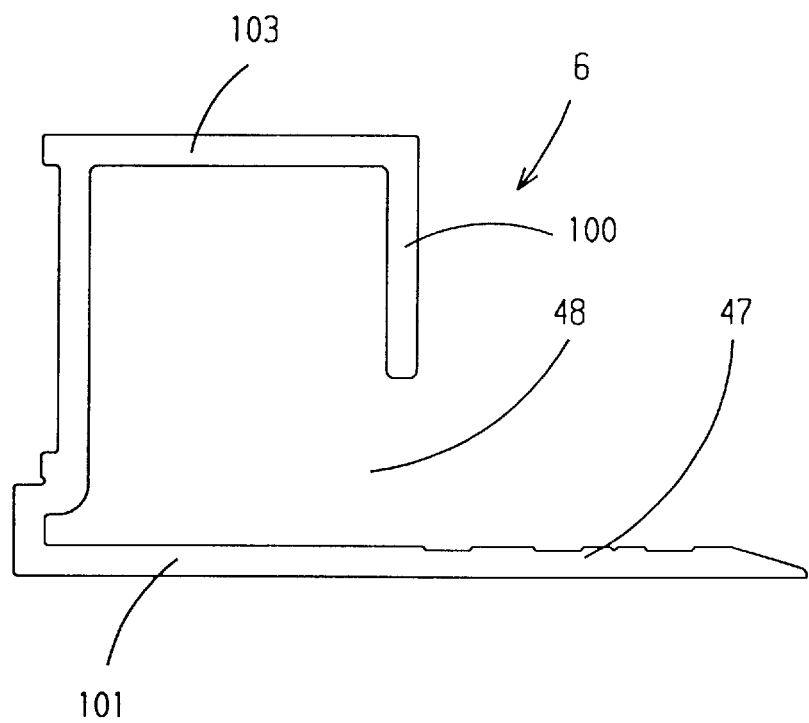
FIG. 10 is a cross section through a floor profile as illustrated in FIGS. 1 to 3.

Fastened to the other long side 45 of the bottom profile 10 is a roller 7 which runs in a floor profile 6 (FIG. 10) which is fastened on the floor side and is oriented parallel to the leaf 2. The floor profile 6 has a substantially rectangular shape and in one lateral surface 100 has a slot 48. The base surface 101, which can be free-punched on one side, tapers into an installation plate 47 that projects laterally beyond the floor profile 6. A plurality of countersunk borings 102 are bored into the installation plate 47. The ceiling or cover surface 103 of the floor profile 6 has a boring 104. The roller 7 is mounted on a stub axle 105. The stub axle 105 is located on a double-bent flat mounting or bracket 106, and is fastened so that it is engaged in the profile 17 of the door leaf 2. The bottom profile 10 of the side piece 1 straddles with the long sides 45 the floor profile 6, so that the side piece 1 is thereby positioned with respect to the leaf 2.

During factory assembly, the floor profile 6 is positively inserted or inserted in a form-fitting manner into the bottom fastening area 41 of the profile 10 of the side piece 1, and then screwed with a set screw 107 through the boring 104 in the cover surface 103 to the profile 10. The mounting or bracket 106 of the roller 7 is fastened on the inside in the profile 17 of the leaf 2. The angle profile 46 is snapped into the fastening area 41 of the profile 10 of the leaf 2. The angle profile 46 has an inserted seal 22 that creates the seal between the leaf 2 and the floor. The side piece 1 and the leaf 2 are delivered to the installation site in this condition. After the ceiling installation, the side piece 1 is pushed only one time into the correct position on the floor, and can be easily fastened by means of screws 108 that are screwed through the countersunk borings 102 of the installation plate 47 into corresponding blind holes 109 in the floor. The side piece 1 is thereby essentially definitively positioned. It is no longer necessary to make repeated adjustments between individual parts. The leaf 2 which is already suspended in the ceiling area is then pressed against the side piece 1. After a closing cap (not shown) is removed from the profile 10 of the side piece 1, the roller 7 can be introduced into the floor profile 6 and pushed, whereby the mounting or bracket 106 runs in the slot 48 of the floor profile 6. Then the closing cap is re-inserted into the profile 10, so that the roller 7 and the leaf 2 cannot accidentally escape from the floor profile 6.

The operation of the floor guide is explained below. When the door leaf 2 is pushed, the roller 7 slides in the floor profile 6 and its movement is limited by, among other things, the closing cap of the floor profile 6. If necessary, the door leaf 2 can be pivoted by the application of mechanical pressure. The leaf 2 thereby pivots around two different axes. In the ceiling area, the pivoting axis is formed by the shaft 81 of the pivot mount 4 located in the profile 17 of the leaf 2. In the floor area, the leaf 2 pivots around the roller 7 in the floor profile 6. As a result of the offset between the top and bottom pivoting axes, the profile 17 or the leaf 2 on the floor side moves during the pivoting on an outwardly directed curved track (FIG. 3). After the leaf 2 has been opened all the way, the top and bottom pivoting,axes are again in their starting position. The deflection movement is so small that the design characteristics and the stability of the sliding or sliding-swinging or swinging door system are not substantially adversely affected.

Figure 11:
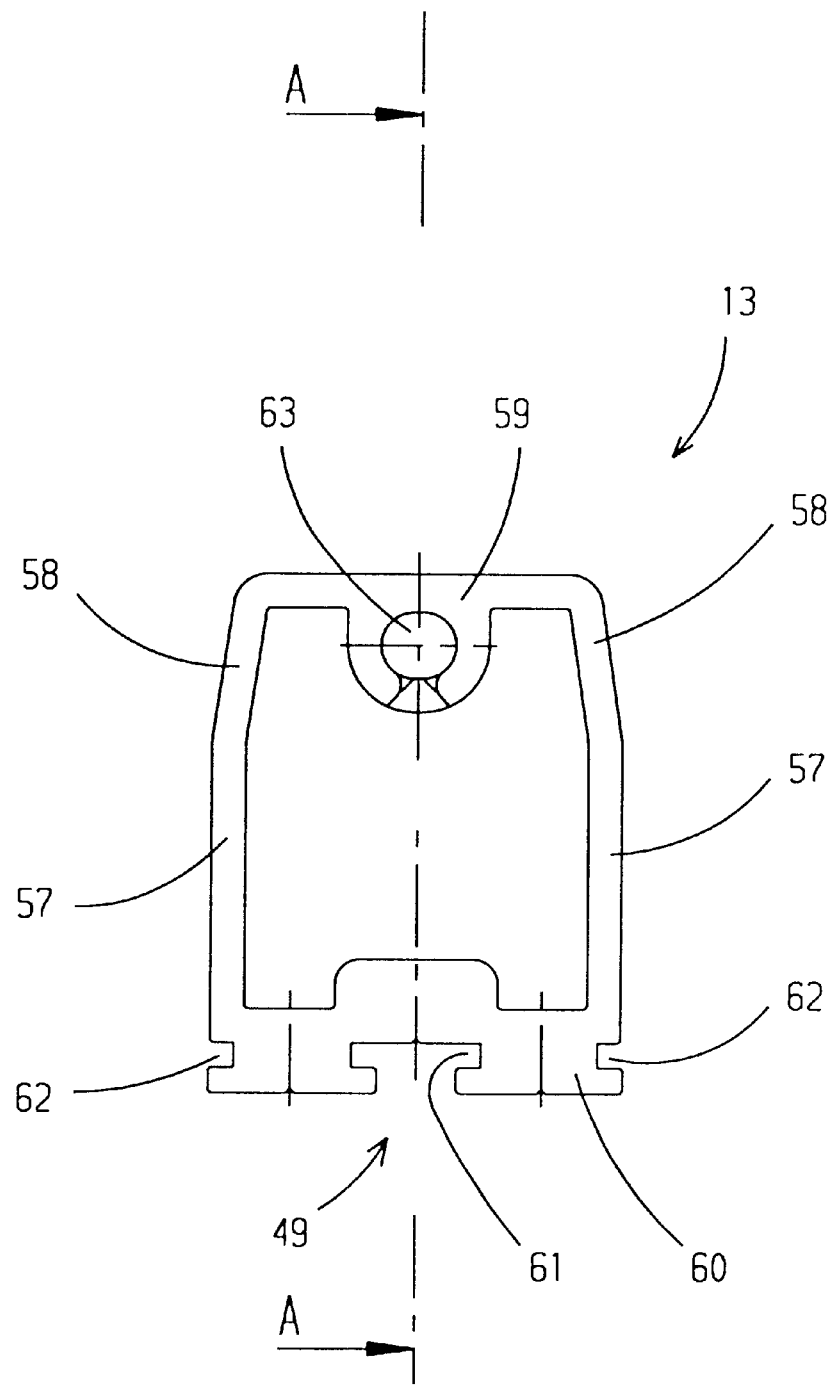
FIG. 11 is a cross section through a profile connector as illustrated in FIGS. 1 to 3.

The butt joint between the profiles 10 to 12 and the profiles 14 to 18, which are oriented perpendicular to one another, is created by means of a profile connector 13 (FIG. 11). The fastening areas 41 described above are also realized on the profiles 14 to 18, so that the profile connector 13 can be inserted, positioned and fastened by means of its complementary fastening base 49. Then the profiles 10 to 12 may be attached and also fastened in place.

The profile connector 13 has a substantially rectangular cross section, and its length is substantially appropriate to the inside dimensions of the profile 10–12 which will be attached later. The facing side walls 57 end on one side with entry bevels 58 in a front wall 59, and on the other side in a base wall 60 that is opposite the front wall. The base wall 60 has a relatively large wall thickness, so that the fastening base 49 which is complementary to the fastening area 41 of a profile 14 to 18 can be realized. In the center of the base wall 60, there is a T-shaped channel 61 which, when the profile connector 13 is inserted, slides positively or in a form-fitting manner in the fastening area 41 along the T-shaped projection 44. Moreover, on the outside, in each of the two side walls 57 of the profile connector 13, at the level of the base wall 60, there is a groove 62, which interacts in a sliding manner with the respective hooks 42 of the fastening area 41. Inside the profile connector 13, in the center of the front wall 59, there is a hollow, tubular-shaped pin receptacle 63 that extends in the longitudinal direction of the profile connector 13, and is realized in one piece with the profile connector 13. In the base wall 60 of the profile connector 13, there are two threaded holes 19, into which corresponding set screws 20 can be screwed to fasten the profile connector 13 to a profile 14 to 18.

Also machined into the base wall 60 are two borings 121 into which set screws 122 are inserted. Machined into the front wall 59 are four openings 123 to introduce the set screws 120 into the threaded borings 119 and the threaded stems 122 into the borings 121 and to access them. The threaded borings 119 are each located centrally in the base wall 60 and longitudinally at the ends of the profile connector 13. The two borings 121 are offset eccentrically next to the two threaded borings 119 in the base wall 60. The hole pattern of the openings 123 in the front wall 59 corresponds to the location of the threaded borings 119 and the borings 121 in the base wall 60. The openings 123 that correspond to the central threaded borings 119 necessarily penetrate the pin receptacles 63 realized in the front wall 59.

The following description relates to the connection of the profile 17 with the profiles 11 by means of the profile connector 13, whereby these specific profiles 11 and 17 can be considered representative of the other profiles. For this purpose, the profile connector 13 is inserted with its fastening base 49 into the fastening area 41 of the profile 17, and positioned on the basis of the specified installation measurements. After the profile connector 13 has been positioned, the set screws 120 are introduced through the two openings 123 into the two threaded borings 119, and screwed against the projection 44. The set screws 120 extend out of the threaded borings 119 and, by means of the notch 118 in the projection 44, center the profile connector 13 in the fastening area 41. Then the profile connector 13 is finally fastened to the profile 17 by means of threaded stems 122 which are inserted through the openings 123 and the borings 121 of the profile connector 13. The threaded stems 122 are for this purpose screwed by means of tools (not shown) into the profile wall 40 of the profile 17. By means of the action of the force on the threaded stems 122, a corresponding hole 124 created in the profile wall 40. The profile 11 is then inserted perpendicular to the profile 17 above the profile connector 13. The entry bevels 58 on the side walls 57 of the profile connector 13 facilitate the connection. After the profile 11 has been pushed all the way onto the profile connector 13, the pre-punched holes 126 in the profile walls 127 of the profile 11 are aligned with the hollow pin receptacle 63. Through the pre-punched holes 126, steel pins 128 are friction-fitted into the pin receptacle 63 of the profile connector 13, thereby substantially guaranteeing a permanent connection between the profile 17 and the profile 11.

An assembly device or jig 129 facilitates the pressing of the steel pins 128 through the holes 126 into the pin receptacle 63 of the profile connector 13. The assembly device 129 is positioned in one half of the corresponding fastening area 41 of the profile 11, so that an integrated threaded bolt 130 is oriented above the steel pin 128 that has been pre-installed in the pre-punched hole 126. The threaded bolt 130 is located in the assembly device 129 in a guide 131, so that when force is applied by means of a screw-tightening device, e.g. a manual or power screwdriver, a vertically oriented impulse force is applied to the steel pin 128 and the profile 11 is fixed to the profile connector 13. The optimal depth of impression for the steel pin 128 is also determined by an edge 132 in the guide 131.

The assembly device 129 consists of longitudinally split halves 133, 134 which can be pressed together and held together by means of a spring device 135. When manual force is applied to the spring device 135, the assembly device 129 is pressed together so that it can be placed in the fastening area 41. When the spring device 135 is relaxed, there is a spring-loaded form-fit inside the fastening area 41. Following the impression of the steel pin 128, the assembly device 129 can be removed from the fastening area by compressing the spring device 135.

Figure 12:
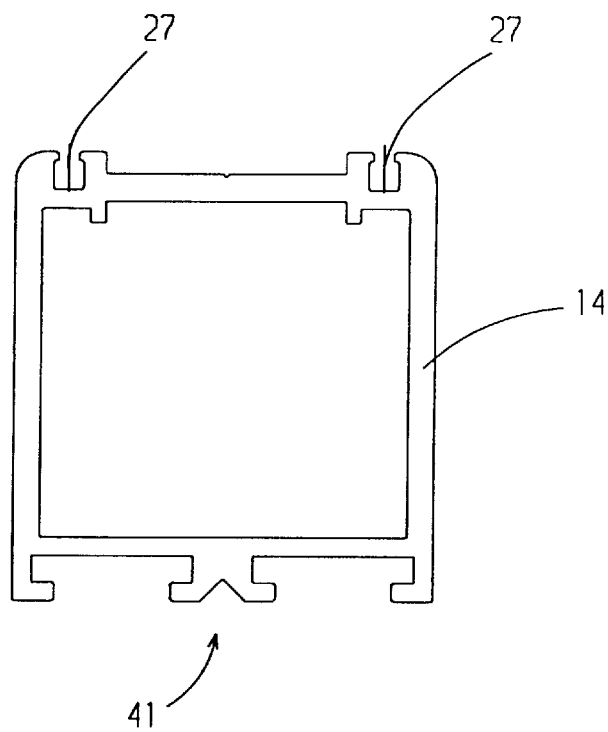
FIG. 12 is a cross section through a profile of the side piece as illustrated in FIGS. 1 to 3.
Figure 13:
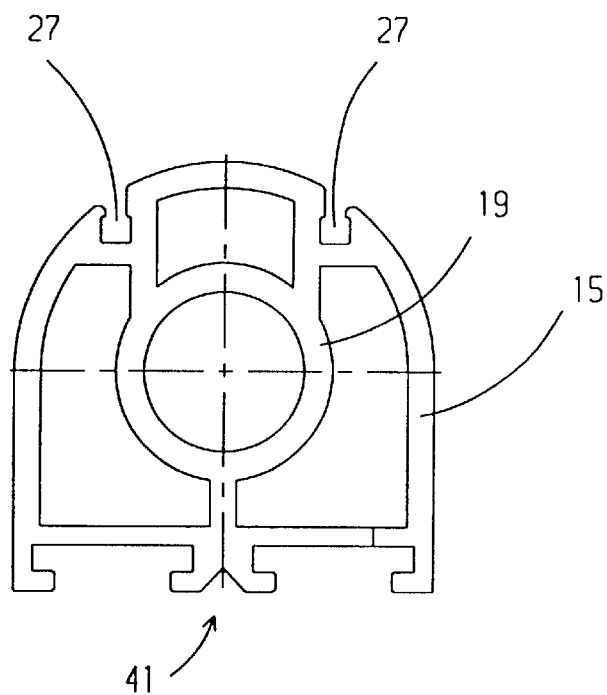
FIG. 13 is a cross section through an additional profile for the side piece as illustrated in FIGS. 1 to 3.
Figure 13A:
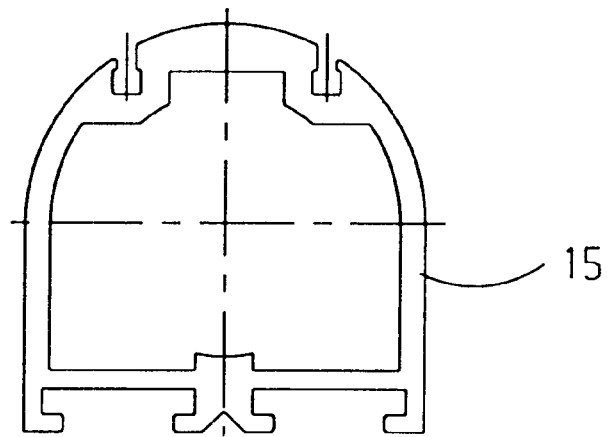
FIGS. 13a and 13b are cross sections through an alternatively divided realization of the profile a and b as illustrated in FIGS. 1 to 3.
Figure 13B:
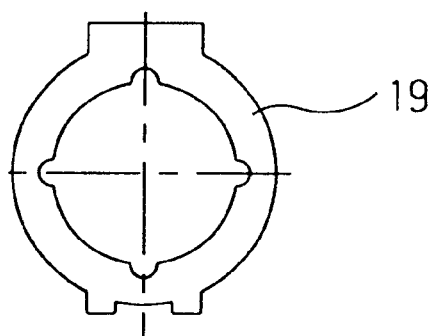

A wall-side profile 14 (FIG. 12) of the side piece 1 is substantially square and is equipped with a fastening area 41. Opposite the fastening area 41, two receptacle chambers 27 for seals 22 are realized, so that a stationary connection with the wall is created. An alternative to the realization with a pivoting side piece 1 is illustrated in FIG. 13. A profile 15 that is semi-circular on one side thereby slides along a wall in tight contact. In the profile 15, to hold a shaft (not shown), there is a round inner profile 19. As shown in FIGS. 13a and 13b, the inner profile 19 can advantageously be realized in the form of a separate component, to facilitate an adaptation to shafts that have different diameters. Different internal profiles 19 can then be taken from inventory and used as appropriate for the shaft diameter. The external contours of the inner profile 19 are substantially identical, so that there is an at least form-fitting or positive interaction with the profile 15.

Figure 14:
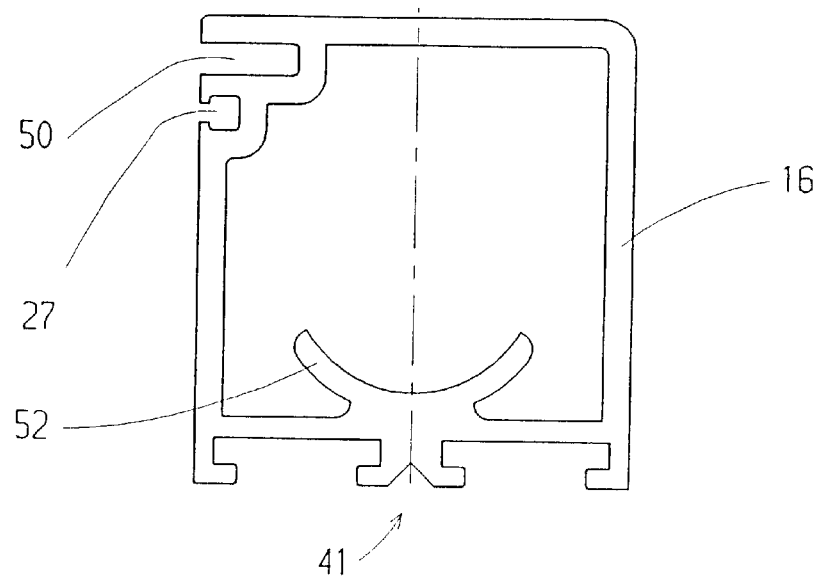
FIG. 14 is a cross section through an additional profile of the side piece as illustrated in FIGS. 1 to 3.
Figure 15:
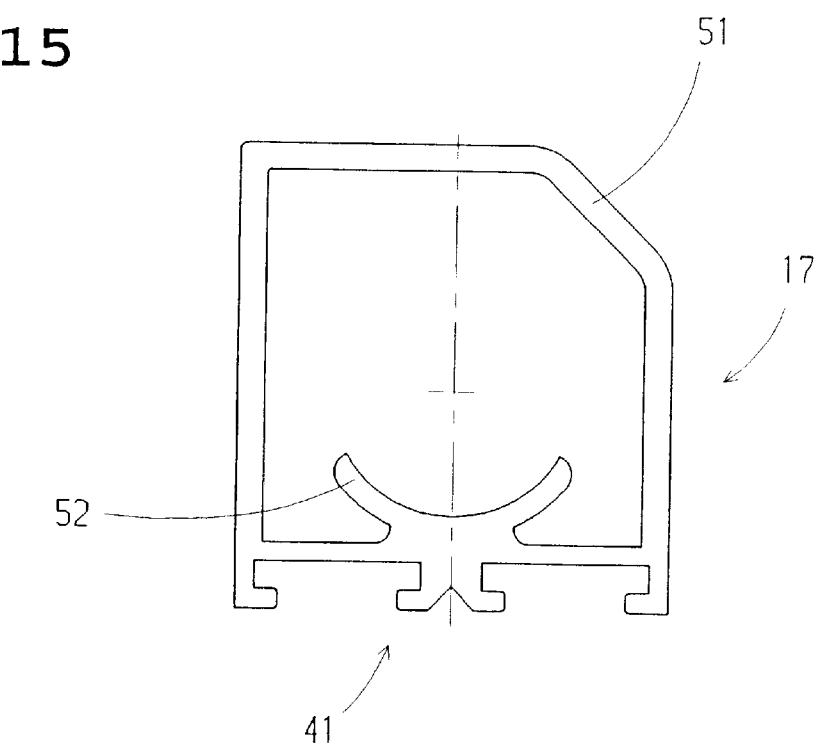
FIG. 15 is a cross section through a profile of the movable element as illustrated in FIGS. 1 to 3.
Figure 16:
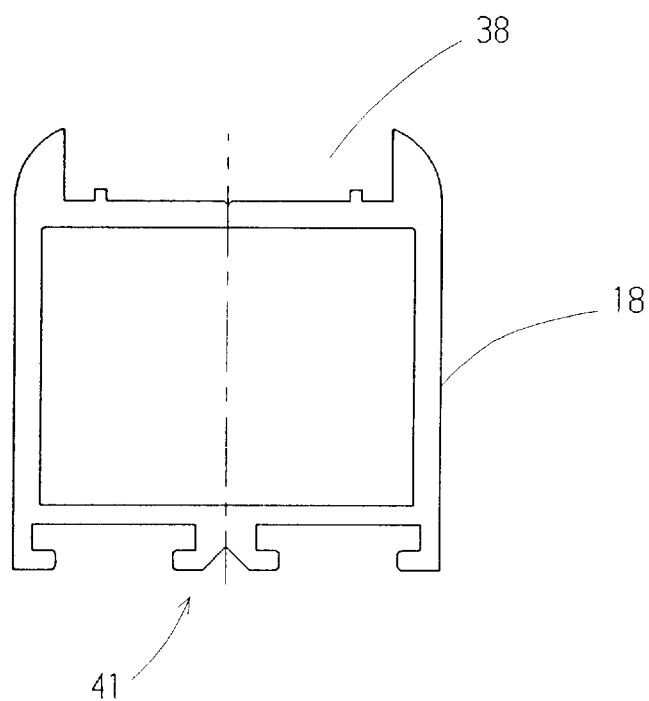
FIG. 16 is a cross section through an additional profile of the moving element as illustrated in FIGS. 1 to 3.
Figure 17:
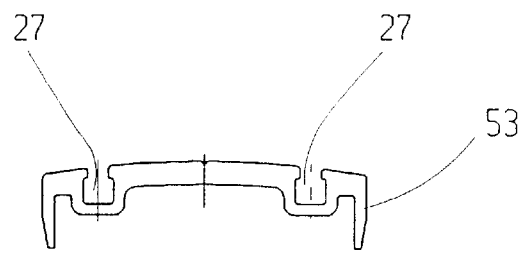
FIG. 17 is a cross section through an edge of the profile as illustrated in FIG. 16.

The leaf-side profile 16 (FIG. 14) of the side piece 1 has, in addition to the fastening area 41 and the receptacle chamber 27 for a seal 22, a groove 50 to hold a retaining hook (not shown) which to prevent intrusions holds the side piece 1 and the leaf 2 tight up against each other in the closed position. The wall-side profile 17 (FIG. 15) of the leaf 2 is substantially square, and has a bevel 51, to prevent damage to the side piece 1 in the event of the pivoting. On one side there is a fastening area 41. Inside the profile 17 there is a shell-shaped inner wall 52 for the shaft 81 of the pivot mounting 4. The outside profile 18 (FIG. 16) of the leaf 2, which simultaneously represents the main closing edge 38 of the system, differs from the profile 14 illustrated in FIG. 12 in the creation of a separate profile 53 (FIG. 17), on which the receptacle chamber 27 is realized. This two-part design makes it possible to have variations in the configuration of the main closing edge 38. The connection between the profile 53 and the profile 18 is accomplished by means of an adhesive connection.

Figure 18:
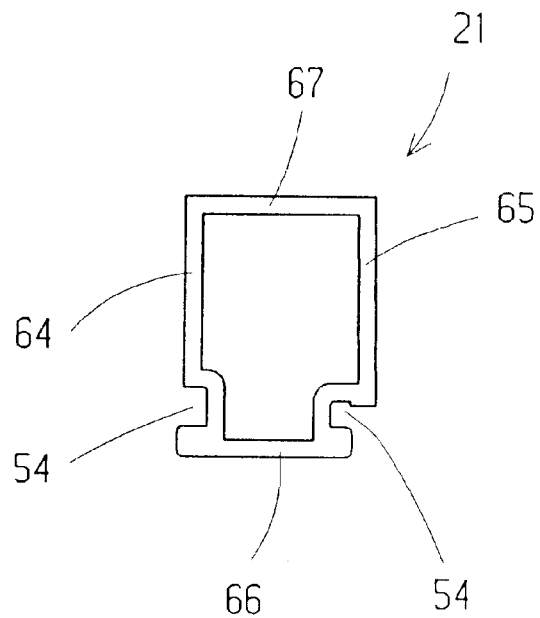
FIG. 18 is a cross section through a glass molding as illustrated in FIGS. 1 to 3.
Figure 19:
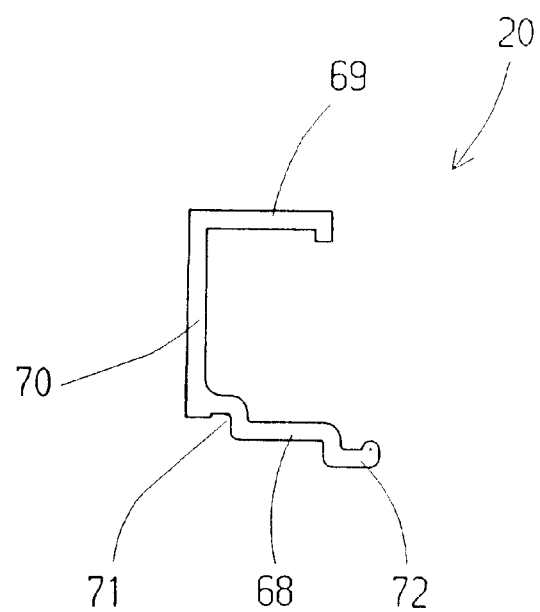
FIG. 19 is a cross section through a glass molding as illustrated in FIGS. 1 to 3.

The glass moldings 20, 21 illustrated in FIGS. 18 and 19 are used to fasten the glass panes 9 in the fastening areas 41 of the surrounding profiles 10–12 and of the profiles 14 to 18. As a result of the use of two separate glass moldings 20, 21, between which the glass pane 9 is held, the profiles can remain unchanged in every realization. Variants or options in the glass system are made possible by correspondingly adapted glass moldings 20, 21. It is thereby essential that the connection to the profile always remains substantially the same. The potential for modification is created by different shapes or cross sections of the glass moldings 20, 21. The substantially symmetrical construction of the profiles makes it possible to use them universally, and is the basis for a substantially uniform connection principle, which also essentially guarantees the connection to additional profiles.

The projection 44 is realized centrally inside the fastening area 41, which results in a substantially symmetrical construction. The glass moldings 20, 21 each have corresponding fastening bases, which are inserted or buttoned in a form-fitting manner in one half of the fastening area 41. The glass pane 9 is located centrally with respect to the width of the profile. The two glass moldings 20, 21 are different, however, in terms of their form and function.

The glass molding 21 illustrated in FIG. 18 has a substantially rectangular cross section, whereby the facing walls 64, 65 each project toward the inside of the body. The walls 64, 65 are limited by side walls 66 and 67, whereby the side wall 66 projects on both sides of the wall 64 and 65 and thus forms undercuts 54.

The glass molding 20 illustrated in FIG. 19 has a C-shaped cross section, whereby its legs 68, 69 are connected by a cross-wall 70. The leg 68 is fastened to the cross-wall 70 by means of an offset step 71, and tapers into a projecting finger 72.

The assembly of the glass moldings 20, 21 and the glass pane 9 is described below. The substantially rectangular glass molding 21 is thereby first inserted into one half of the fastening area 41. The projecting side wall 66 of the glass molding 21 is thereby inserted in a form-fitting manner between a hook 42 and the projection 44. Then the glass pane 9 is fastened by means of a UV-resistant PU strip 56 to the glass molding 21, taking advantage of the adhesion effect. Then the clamp-like glass molding 20 is snapped into the other half of the fastening area 41. The leg 69 thereby presses a seal 55 against the glass pane 9. The leg 68 is engaged with its finger 72 between the projection 44 and is pressed under pressure of the seal 55 with the step 71 against the hook 42, and thus is essentially definitively positioned. It is thereby advantageous that the glass molding 20 is located on the inside, because then any removal of the glass from the outside is substantially prevented on account of the inserted glass molding 21 which is thus essentially tamper-proof.

Figure 20:
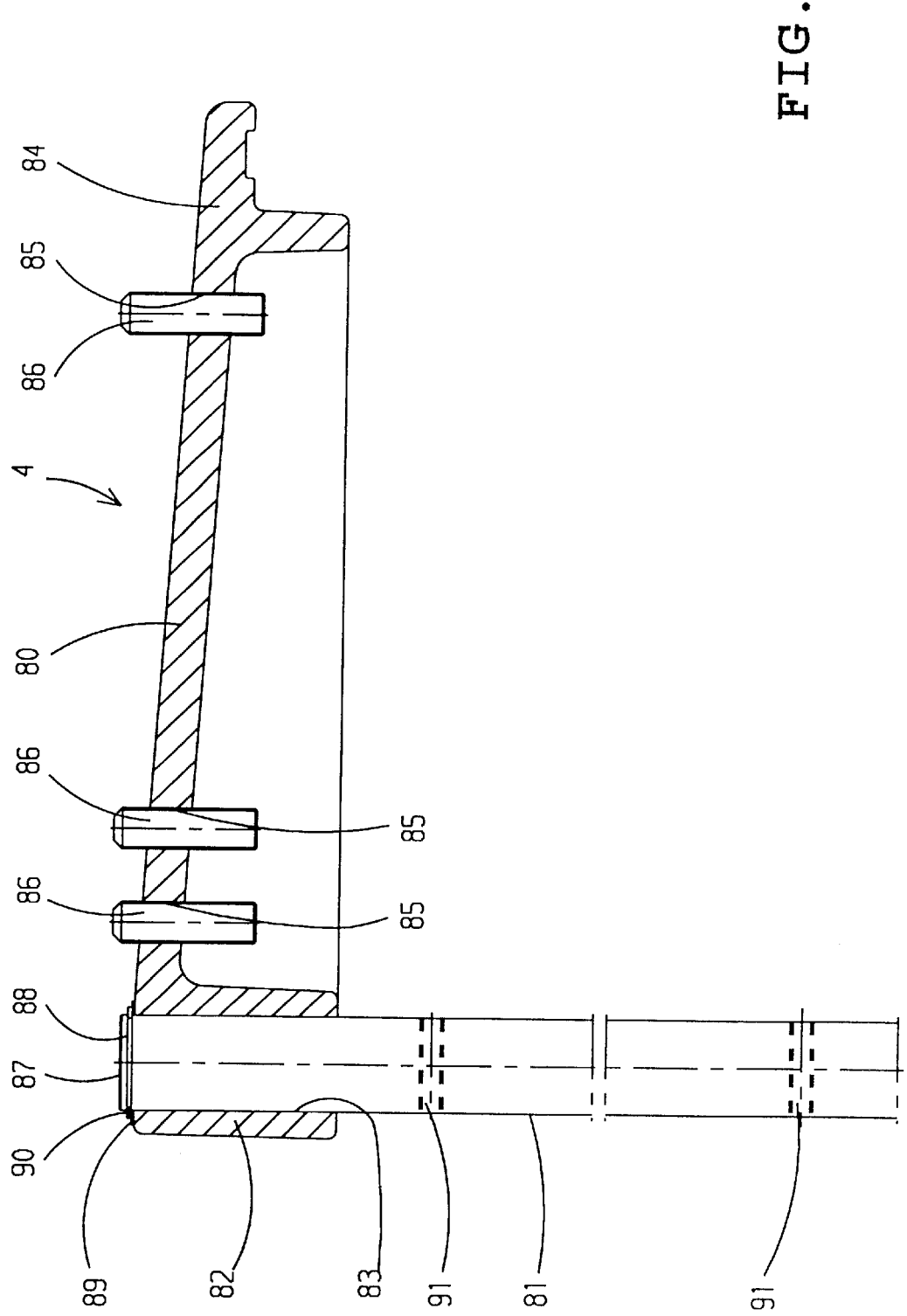
FIG. 20 is an overhead view of a pivot mounting with a support arm shown in cross section.
Figure 21:
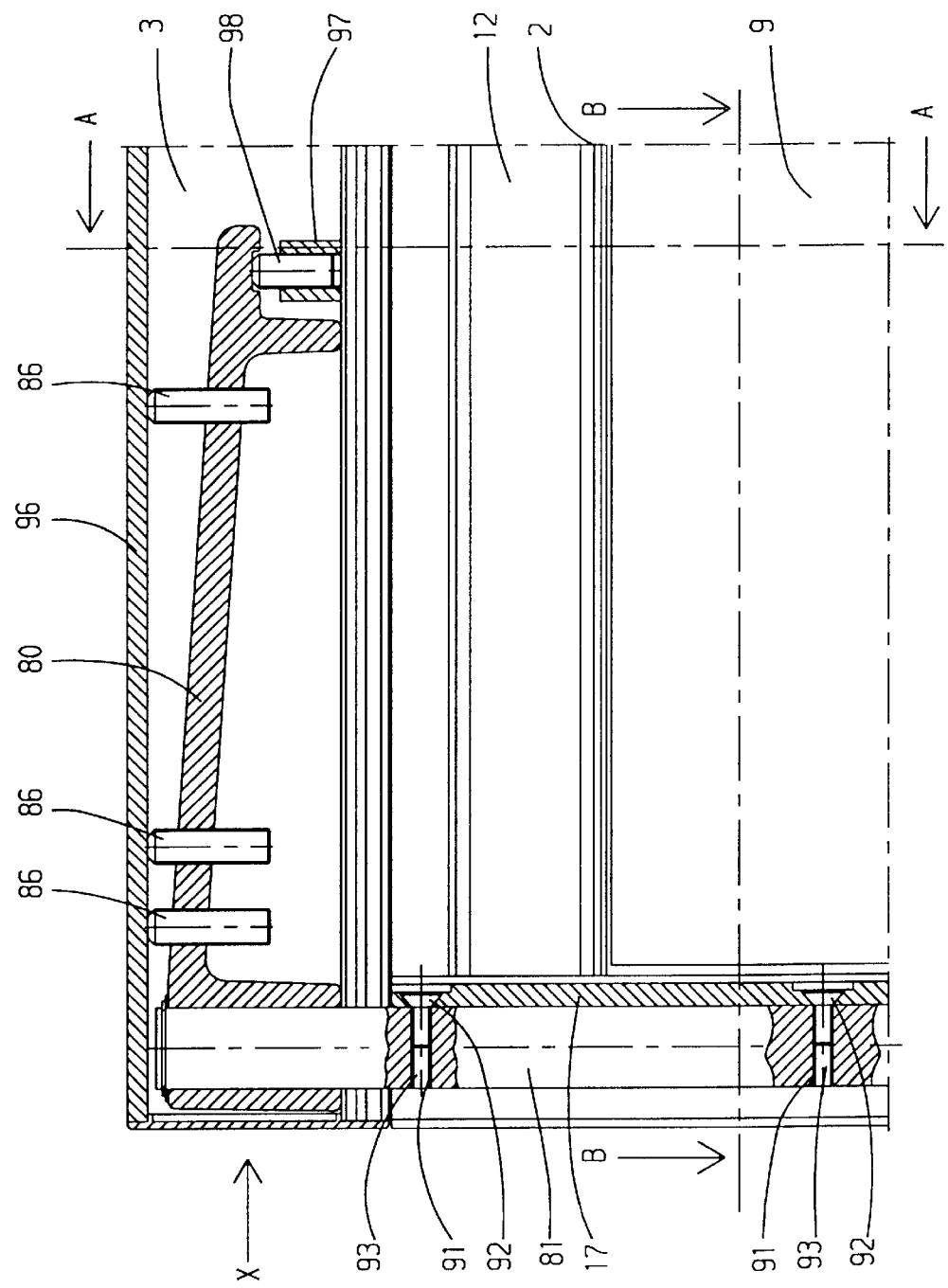
FIG. 21 is a detail of a leaf mounted on a support profile by means of the pivot mounting.
Figure 22:
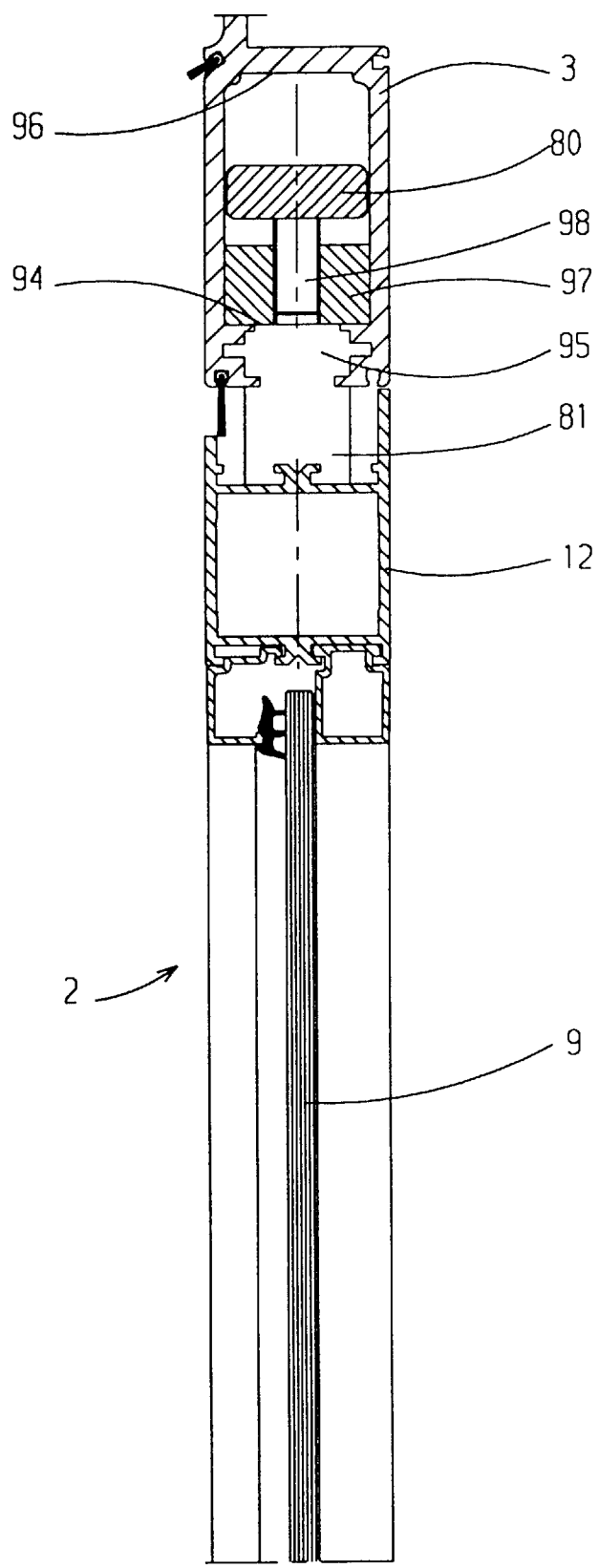
FIG. 22 is a longitudinal section through the support profile and the leaf along Line A—A in FIG. 21.
Figure 23:
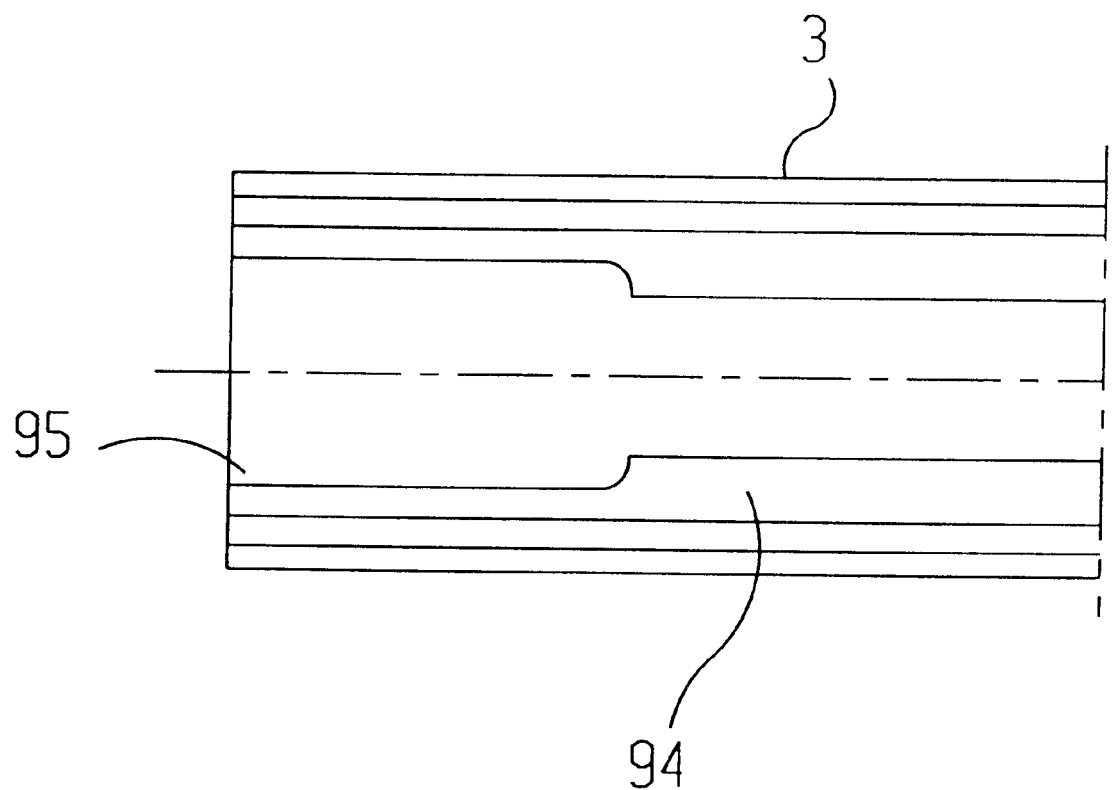
FIG. 23 is a partial view from below of an unoccupied support profile, shown on an enlarged scale.
Figure 24:
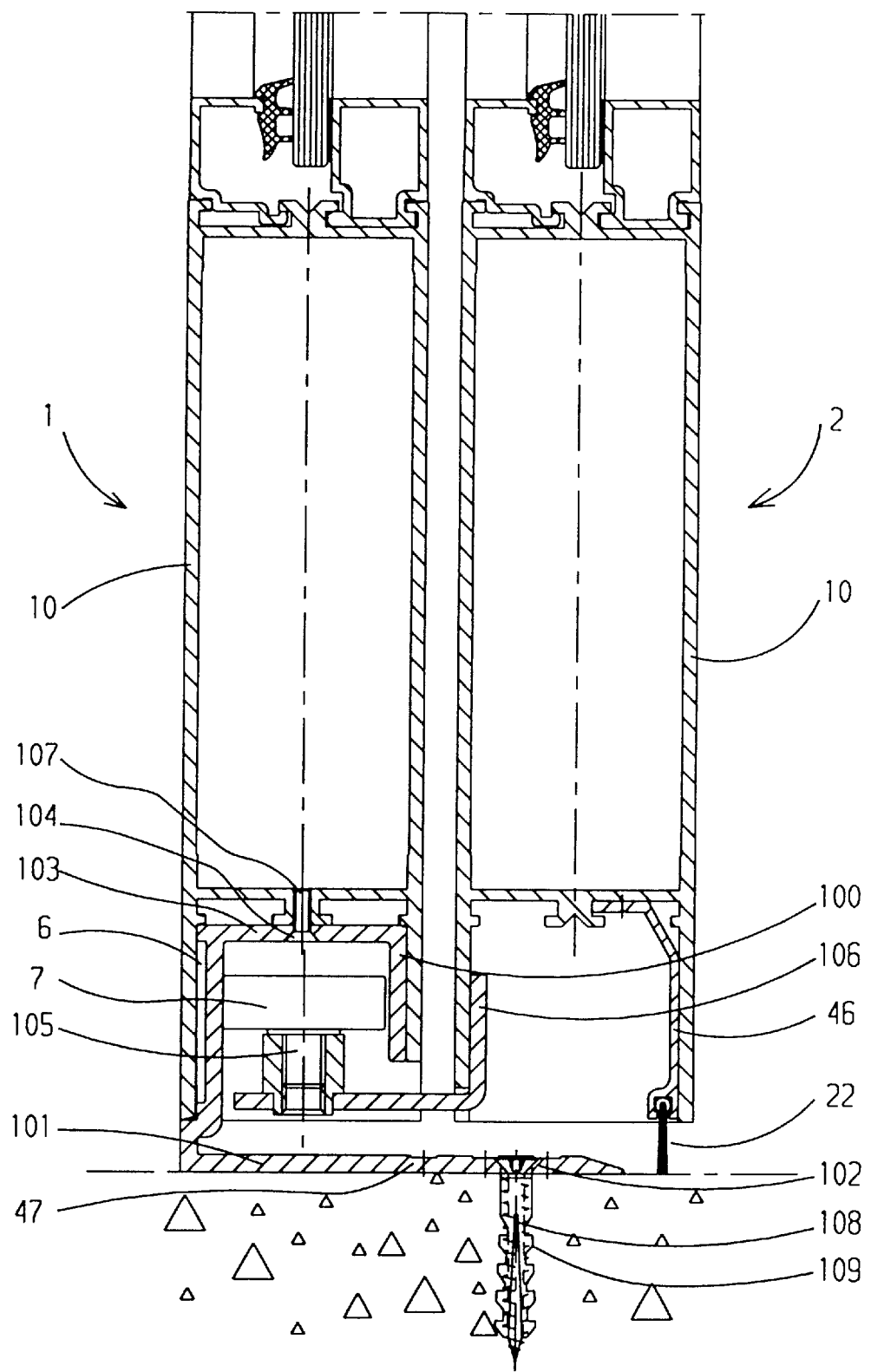
FIG. 24 is a longitudinal section of a sliding-swinging door system in the floor area.
Figure 25:
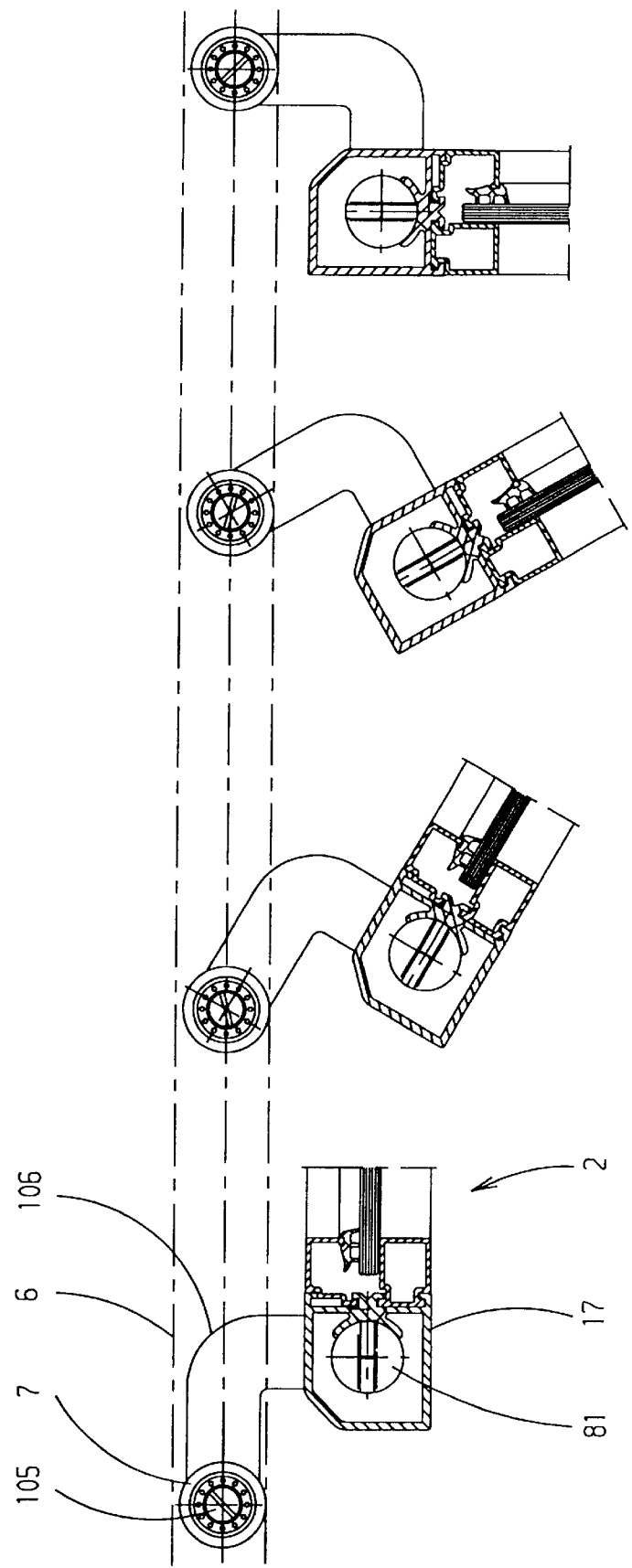
FIG. 25 is a floor-side cross section of the sliding-swinging door system illustrated in FIG. 24 in the various pivoting positions of the door leaf.
Figure 26:
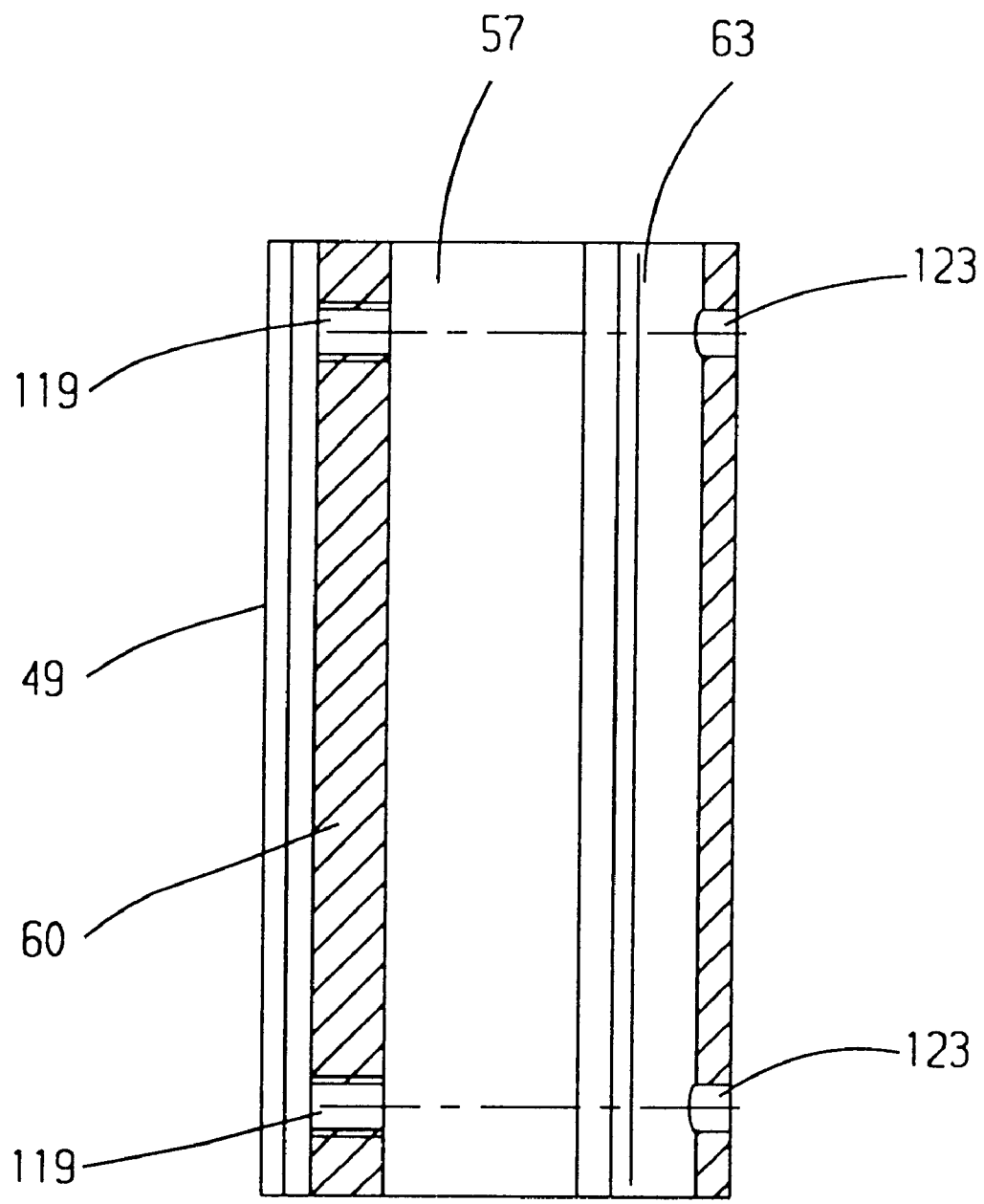
FIG. 26 is a longitudinal section through a profile connector along Line C—C in FIG. 11.
Figure 27:
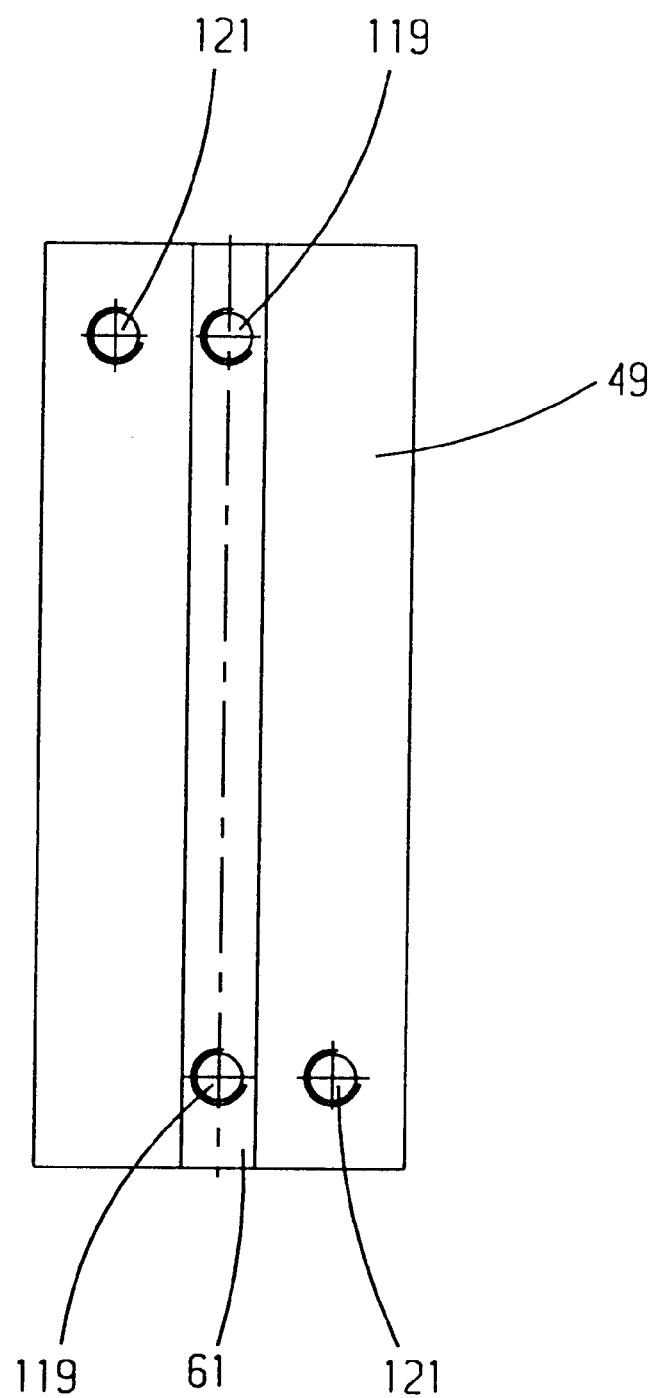
FIG. 27 is a head-on view of the profile connector illustrated in FIG. 11.
Figure 28:
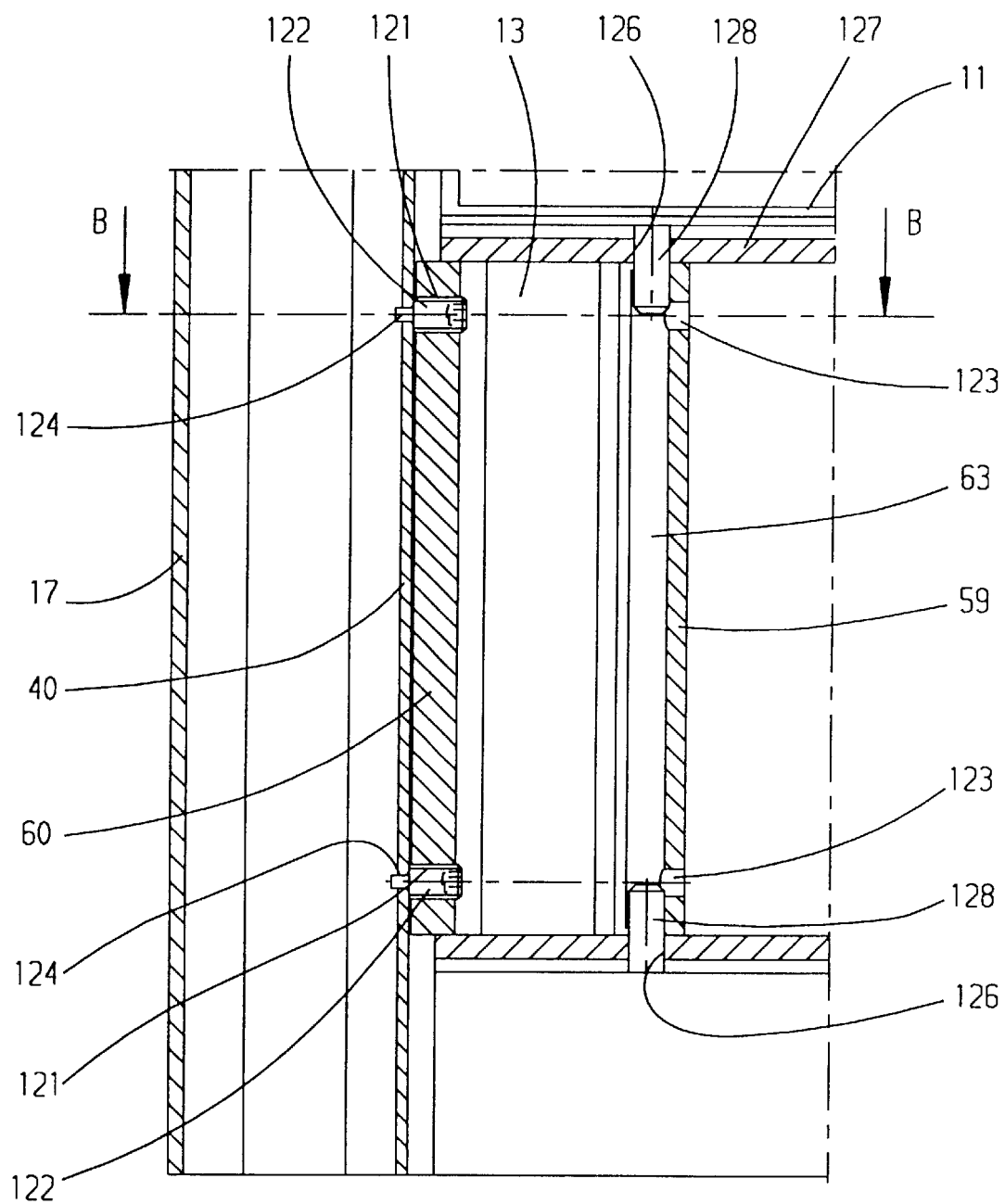
FIG. 28 is a longitudinal section of a profile connector inserted between a first profile and a second profile in a light-alloy frame of a light-alloy door.
Figure 29:
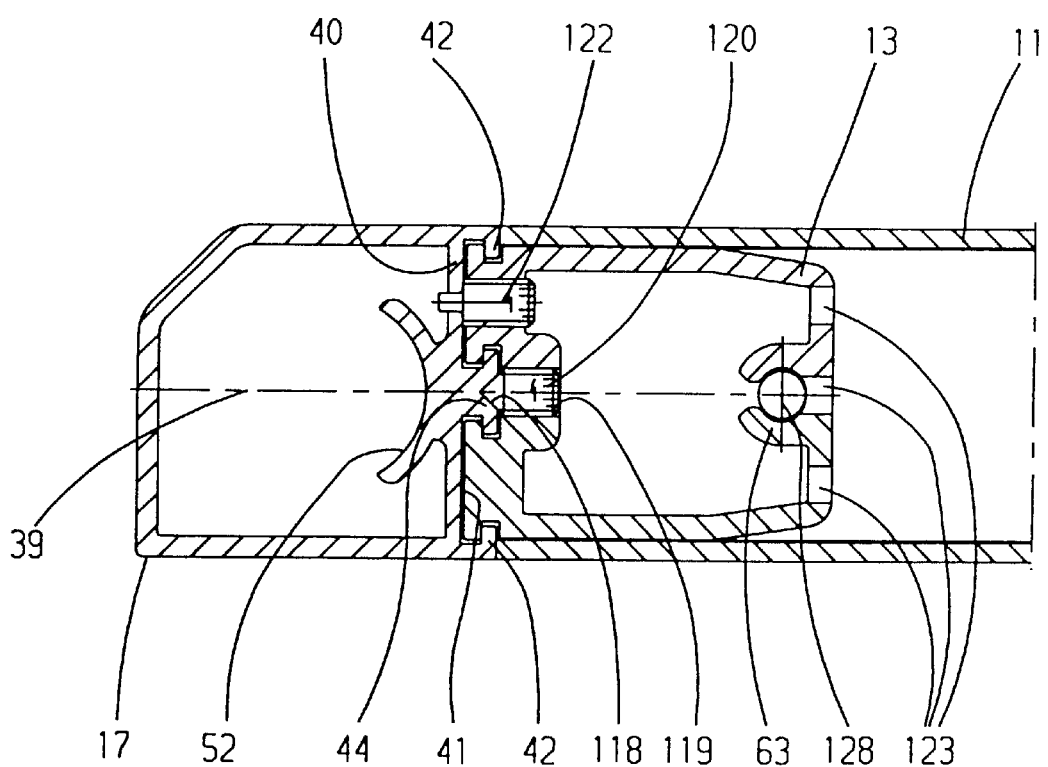
FIG. 29 is a cross section along Line B—B in FIG. 28.
Figure 30:
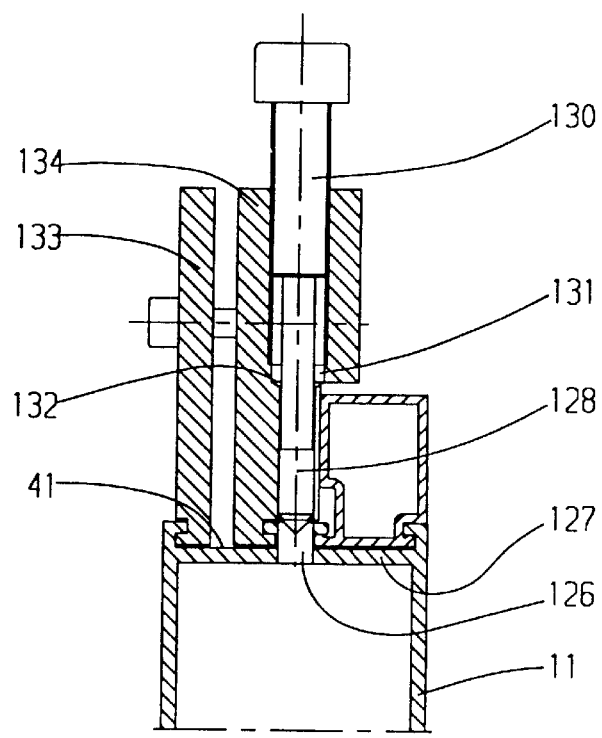
FIG. 30 shows an installation device for the profile connector in a sectional view.
Figure 31:
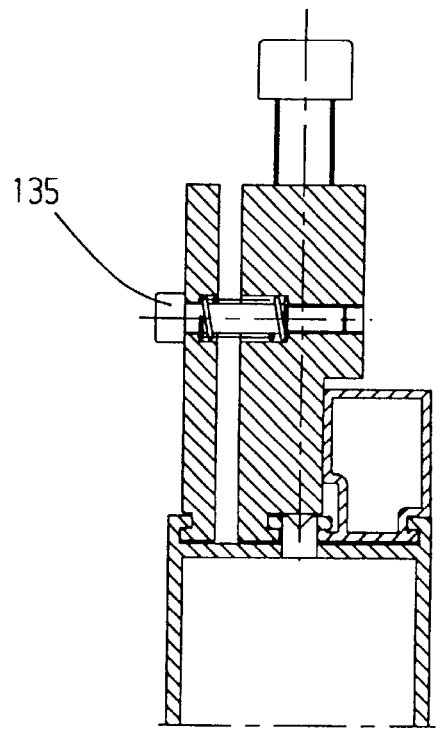
FIG. 31 shows an installation device or jig for the profile connector in an additional sectional view.

The pivot mounting 4 illustrated in FIG. 20 can be used to mount a leaf 2 which is pivotably mounted on the support profile as illustrated in FIGS. 21 to 23. The pivot mounting 4 can consist essentially of a long support arm 80 which may be made of gray cast iron material that contains graphite, and a shaft 81 which may be made of steel.

On the bearing-side end 82 of the support arm 80, perpendicular to its longitudinal dimension, there is a continuous cylinder-shaped bore of the bearing 83. From the bearing-side end 82, the support arm 80 tapers toward the opposite free end 84. Between the bore of the bearing 83 and the free end 84 of the support arm 80, and parallel to the bore of the bearing 83, three threaded borings 85 are machined, into which the screws 86 can be screwed. Not shown is the alternative realization of the support arm 80 with an additional bearing bush inserted in the bore of the bearing 83.

The solid shaft 81 has a substantially constant cross section. Machined into a bearing-side shaft head 87 is an encircling groove 88. The shaft 81 is inserted with the shaft head 87 through the bore of the bearing 83. A ring-shaped disc 89 is installed over the exiting shaft head 87, and the ring-shaped disc is locked in position by a retaining ring 90, preferably a snap ring, that is engaged in the groove 88. Thus the shaft 81 is captive, but can still rotate in the bore of the bearing 83. The material characteristics of the bearing arm 80 and of the shaft 81 make possible a sufficient lubrication of the bearing. The ring-shaped disc 89 prevents the shaft from becoming jammed or from being torn completely from the bore of the bearing 83 when a mechanical load is applied to the retaining ring 90. Along the shaft 81 there are a plurality of transverse threaded borings 91.

The pivot mounting 4 is installed in the profile 12 into which the glass pane 9 is later inserted. The shaft 81 is introduced into the profile 17 of the profile 12 to be installed, whereby the shaft 81 extends only in the upper part of the profile 17. The C-shaped inner wall 52 is realized in the profile 17, so that the shaft is inserted in a form-fitting or positive manner, and is thus forcibly guided. After the shaft 81 has been inserted all the way, the threaded borings 91 of the shaft 81 are aligned with borings 92 in the profile 17. Screws 93 are inserted through the borings 92 and are screwed into the threaded borings 91 of the shaft 81. The shaft 81 is thus non-rotationally fixed in the profile 17.

Then the support arm 80 is stuck onto the shaft 81 and rotationally fastened by means of the ring-shaped disc 89 and the retaining ring 90. The support arm 80 is then inserted in a form-fitting manner into the slotted support profile 3 in the direction X. The support profile 3, in its lower profile wall 94, has a slot 95, by or through which the shaft 81 is guided during the insertion. Moreover, the screws 86 for fastening the support arm 80 can also be accessed through this slot 95. For this purpose, the screws 86 are screwed through the threaded borings 85 in the support arm 96 inside the support profile 3 against its upper profile wall 96, so that the support arm 80 is pressed and thus restrained by its force-fit or form-fit or non-positive or positive connection with the support profile 3 against the lower profile wall 94.

In addition, between the free end 84 of the support arm 80 and the lower profile wall 94, there are adjustment means 97, by means of which the leaf 2 can be oriented with respect to the support profile 3. Located in the adjustment means 97 is a set screw 98 which can also be accessed through the slot 95. After the profile 12 of the leaf 2 has been rotationally mounted by means of the pivot mounting 4 on the support profile 3, the glass pane 9 inserted in the profile 12. As a result of the increased weight, the door leaf 2 can sag with respect to the support profile 3. In that case, the screws 86 are loosened, and by tightening the set screw 98, the support arm 80 and thus the leaf 2 can be correctly oriented with reference to the support profile 3. Then the support arm 80 is again restrained in the support profile 3 by means of the screws 86. The leaf 2 can also be adjusted after the final installation of the leaf 2.

FIG. 32 is a head-on view of a sliding-swinging door system that may be used in conjunction with the present invention. Door panels 200 may be attached to a door frame 202 and closed by means of closing devices 201.

One feature of the invention resides broadly in the light alloy frame profile system for windows and doors, in particular sliding-swinging door systems with a side piece 1 and at least one movable leaf 2, consisting of a plurality of profiles that are fixed to one another by means of fastening areas 41, wherein the fastening area 41 is realized in one piece on a transverse side 40 of a profile 10 to 18 and consists of a rail 43 formed by two hooks 42 and a projection 44 located between them.

Another feature of the invention resides broadly in the light alloy frame profile wherein the hooks 42 are in flush contact with a long side 45 that is contiguous with the transverse side 40.

Yet another feature of the invention resides broadly in the light alloy frame profile system wherein the long sides 45 are elongated beyond the hooks 42.

Still another feature of the invention resides broadly in the light alloy frame profile system wherein the projection 44 is realized in a dovetail shape and is located centrally between the hooks 42.

A further feature of the invention resides broadly in the light alloy frame profile system wherein profile connectors 13 connect the profiles 10 to 18 that abut one another.

Another feature of the invention resides broadly in the light alloy frame profile system wherein the profiles 10 to 18 have fastening areas 41 and the profile connectors 13 have fastening bases 49 that are complementary to them.

Yet another feature of the invention resides broadly in the light alloy frame profile system wherein a substantially rectangular receptacle chamber 27 is realized with a slot-like contraction 28 to hold seals 22 in at least one profile 10 to 18.

Still another feature of the invention resides broadly in the light alloy frame profile system wherein a pivot mounting 4 is located in a support profile 3 and a profile 17.

A further feature of the invention resides broadly in the light alloy frame profile system wherein the support profile 3 is realized in an H-shape and the ends 26 of both long legs 23, 25 are thickened on the inside.

Another feature of the invention resides broadly in the light alloy frame profile system wherein an interlocking profile 31 is realized in a U-shape and a locking hook 32 is realized in one piece on the outside on a base 35.

Yet another feature of the invention resides broadly in the light alloy frame profile system wherein there are substantially identical interlocking profiles 31 on the support profile 3 and on a profile 10 centrically substantially symmetrical to one another.

Still another feature of the invention resides broadly in the light alloy frame profile system wherein an angle profile 46 is located in a profile 10.

A further feature of the invention resides broadly in the light alloy frame profile system wherein the profile 10 of the side piece 1 is located stationary on a floor profile 6 fastened on the floor side, and fastened to the profile 17 of the leaf 2 is the floor guide that consists of a mounting 106 and a roller 2, and the leaf 2 is mounted on the side piece 1 so that it can move by means of the roller 7 located in the floor profile 6.

Another feature of the invention resides broadly in the light alloy-frame profile system wherein the floor profile 6 is substantially rectangular and in one side surface 100 has a slot 48 and that the floor profile 6 has an elongated base surface 101 that ends as an installation plate 47.

Yet another feature of the invention resides broadly in the light alloy frame profile system wherein the roller 7 can be fastened to the profile 17 by means of a bent mounting 106.

Still another feature of the invention resides broadly in the light alloy frame profile system wherein the profile 18 has a replaceable profile edge 53.

A further feature of the invention resides broadly in the light alloy frame profile system wherein the profile 17 has a bevel 51.

Another feature of the invention resides broadly in the light alloy frame profile system wherein the profile 16 has a retaining hook.

Yet another feature of the invention resides broadly in the light alloy frame profile system wherein the glass pane 9 is located between two separate glass moldings 20, 21 that are located in the substantially symmetrically realized fastening area 41.

Still another feature of the invention resides broadly in the light alloy frame profile system wherein the glass molding 21 can be inserted and the glass molding 20 can be buttoned into place.

A further feature of the invention resides broadly in the light alloy frame profile system wherein the glass pane 9 is fastened to the insertable glass molding by means of a PU strip 56 using the adhesion effect.

Another feature of the invention resides broadly in the light alloy frame profile system wherein the glass molding 21 has a substantially rectangular cross section, whereby each of the facing walls 64, 65 projecting toward the inside of the body is limited by side walls 66, 67 and a side wall 66 projects on both sides of the walls 64, 65.

Yet another feature of the invention resides broadly in the light alloy frame profile system wherein the glass molding 20 has a C-shaped cross section, whereby its legs 68, 69 are connected by means of a cross wall 70 and the leg 68 is fastened by means of a recessed step 71 to the cross wall 70 and ends in a projecting finger 72.

Still another feature of the invention resides broadly in the light alloy frame profile system wherein the glass pane 9 is located centrally with respect to the width of the profiles 10–12, 14–18.

A further feature of the invention resides broadly in the light alloy frame profile system wherein the pivot mounting consists of a support arm 80 and a shaft 81, whereby the support arm 80 is located in the support profile 3 and the shaft 81 is located in the profile 18 of a leaf 2 which is pivotably mounted on the support profile 3, and whereby the shaft 81 is located so that it can rotate in a bore of the bearing 83 that penetrates the support arm 80 and is located directly and non-rotationally in the profile 17.

Another feature of the invention resides broadly in the light alloy frame profile system wherein the support arm 80 is made of gray cast iron containing graphite.

Yet another feature of the invention resides broadly in the light alloy frame profile system wherein a bearing bush is fixed in the bore of the bearing 83.

Still another feature of the invention resides broadly in the light alloy frame profile system wherein the shaft 81 has a substantially constant cross section and is not machined.

A further feature of the invention resides broadly in the light alloy frame profile system wherein a ring-shaped disc 89 is located between the retaining ring 90 that can be attached to a bearing-side shaft head 87 in a groove 88 and the support arm 80.

Another feature of the invention resides broadly in the light alloy frame profile system wherein transverse penetrating threaded borings 91 are realized in the shaft 81.

Yet another feature of the invention resides broadly in the light alloy frame profile system wherein the shaft 81 is located in a form-fitting manner in the profile 17.

Still another feature of the invention resides broadly in the light alloy frame profile system wherein the shaft 81 is fastened in the profile 17 on the C-shaped inner wall 52, whereby screws 93 are located in aligned borings 92 of the inner profile 17 and in threaded borings 91 of the shaft 81.

A further feature of the invention resides broadly in the light alloy frame profile system wherein the support arm 80 is realized so that it tapers beginning from the bore of the bearing 83.

Another feature of the invention resides broadly in the light alloy frame profile system wherein the support arm 80 is positively and non-positively located in the support profile 3.

Yet another feature of the invention resides broadly in the light alloy frame profile system wherein the support arm 80 is restrained in the support profile 3.

Still another feature of the invention resides broadly in the light alloy frame profile system wherein adjusting means 97 are located underneath the free end 84 of the support arm 80.

A further feature of the invention resides broadly in the light alloy frame profile system wherein the profile connector 13 is realized symmetrically and in the center on a front wall 59 with a tubular pin receptacle 63, whereby the fastening base 49 has a T-shaped channel 61 in one base wall 60 and grooves 62 in side walls 57, and the second profile 10–12 can be reverse-drawn and fastened substantially friction-tight by means of the profile connector 13.

Another feature of the invention resides broadly in the light alloy frame profile system wherein in the base wall 60, there are threaded borings 119 and borings 121, and openings 123 aligned with said borings in the front wall 59.

Yet another feature of the invention resides broadly in the light alloy frame profile system wherein the second profile 10–12 can be fastened to the profile connector 13 by means of an assembly device 129.

Still another feature of the invention resides broadly in the light alloy frame profile system wherein the assembly device 129 can be placed in a form-fitting manner in the fastening area 41.

A further feature of the invention resides broadly in the light alloy frame profile system wherein the assembly device 129 consists of two halves 133, 134 that are held to each other by means of a spring device 135.

Another feature of the invention resides broadly in the light alloy frame profile system wherein in a guide 131 of the assembly jig 129, a threaded bolt or striking pin 13 is guided.

Yet another feature of the invention resides broadly in the light alloy frame profile system wherein an edge 132 is realized in the guide 131.

Still another feature of the invention resides broadly in the method to fasten the profile connector 13 between a first profile 14–18 and a second profile 10–12, wherein the profile connector 13 is pushed by means of the fastening base 49 into the fastening area 41 of the first profile 14–18, the profile connector 13 is positioned on the first profile 14–18, the profile connector 13 is centered with set screws 120 which are screwed against a notch 118 of a projection 44 of the fastening area 41, the profile connector 13 is fastened by a material-displacing threaded stem 122 through a profile wall 40 of the first profile 14–18, the second profile 10–12 is pushed onto the profile connector 13, and the second profile 10–12 is fastened to the profile connector 13 by means of steel pins 128 that are pressed by means of an assembly device 129 through holes 126 in a profile wall 127 of the second profile 10–12 into a pin receptacle 63 of the profile connector 13.

Some examples of housing or access panels which may be utilized or incorporated in an embodiment of the present invention may be found in the following U.S. Pat. No. 5,327,682, issued on Jul. 12, 1994.

Some examples of guide rails or systems for door, wall or partition systems which may be utilized or incorporated in an embodiment of the present invention may be found in the following U.S. Pat. No. 5,538,064, issued to inventor Salice on Jul. 23, 1996; U.S. Pat. No. 5,327,681, issued to inventor Minami on Jul. 12, 1994; U.S. Pat. No. 4,555,828, issued to inventor Matimura on Dec. 3, 1985; and No. 4,084,289, issued to inventor Naimo on Apr. 18, 1978.

Some examples of doors, foldable doors, or door systems and mechanisms and devices for their operation which may be utilized or incorporated in an embodiment of the present invention may be found in the following U.S. Pat. No. 5,762,123, issued to inventors Kuyama, et al. on Jun. 9, 1998; No. 5,651,216, issued to inventor Tillmann on Jul. 29, 1997; No. 5,186,230, issued to inventor Ostrander on Feb. 16, 1993; No. 5,165,142, issued to inventor Pilsbury on Nov. 24, 1992; No. 5,099,903, issued to inventor Chen on Mar. 31, 1992; No. 5,070,926, issued to inventor Behring on Dec. 10, 1991; and No. 4,932,455, issued to inventor Yamada on Jun. 12, 1990.

Some examples of movable partition or wall systems and devices for their operation which may be utilized or incorporated in an embodiment of the present invention may be found in the following U.S. Pat. No. 5,930,953, issued to inventor Estfeller on Aug. 3, 1999; U.S. Pat. No. 5,730,027, issued to inventor Hormann on Mar. 24, 1998; U.S. Pat. No. 5,461,829, issued to inventors Lehto, et al. on Oct. 31, 1995; U.S. Pat. No. 5,404,675, issued to inventor Schmidhauser on Apr. 11, 1995; U.S. Pat. No. 5,329,857, issued to inventor Owens on Jul. 19, 1994; U.S. Pat. No. 5,295,281, issued to inventor Kordes on Mar. 22, 1994; U.S. Pat. No. 5,394,648, issued to inventor Kordes on Mar. 7, 1995; U.S. Pat. No. 5,417,013, issued to inventor Tillman on May 23, 1995; U.S. Pat. No. 5,544,462, issued to inventor Kordes on Aug. 13, 1996; U.S. Pat. No. 5,406,761, issued to inventors Hobbiebrunken, et al. on Apr. 18, 1995; U.S. Pat. No. 5,152,332, issued to inventor Siener on Oct. 6, 1992; U.S. Pat. No. 5,042,555, issued to inventor Owens on Aug. 27, 1991; U.S. Pat. No. 4,934,119, issued to inventor Ybarra on Jun. 19, 1990; U.S. Pat. No. 4,914,878, issued to inventors Tamaki, et al. on Apr. 10, 1990; U.S. Pat. No. 4,895,246, issued to inventor Rizzi on Jan. 23, 1990; U.S. Pat. No. 4,752,987, issued to inventors Dreyer, et al. on Jun. 28, 1988; U.S. Pat. No. 4,596,094, issued to inventors Teller, et al. on Jun. 24, 1986; U.S. Pat. No. 4,555,828, issued to inventor Matimura on Dec. 3, 1985; U.S. Pat. No. 4,458,462, issued to inventor Schold on Jul. 10, 1984; U.S. Pat. No. 4,404,770, issued to inventor Markus on Sep. 20, 1983; and U.S. Pat. No. 4,112,647, issued to inventor Scheid on Sep. 12, 1978.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 198 55 854.6, 198 56 040.0, 198 56 042.7, 298 21 561.6, and 198 56 232.2, filed on Dec. 4, 1998 having inventor Andreas Finke and DE-OS 198 55 854.6, 198 56 040.0, 198 56 042.7, 298 21 561.6, and 198 56 232.2 and DE-PS 198 55 854.6, 198 56 040.0, 198 56 042.7, 298 21 561.6, and 198 56 232.2, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A frame profile system, particularly for a sliding-swinging door assembly including a side piece structure and at least one movable leaf structure, said frame profile system comprising:
    a side piece structure having a frame, said frame including:
        a pair of vertically disposed side members,
        a top member, and
        a base member,
        said members each including at least one wall having securement formations, said securement formations comprising:
        a pair of lateral hooks and a central dovetail formation for securing at least matingly configured glass casing members; and
    at least one movable leaf structure having a frame, said frame including:
        a pair of vertically disposed side members,
        a top assembly, and
        a base member,
        said top assembly comprising:
            a support profile,
            a horizontal member, and
            a pair of interlocking profiles configured to be disposed between said support profile and said horizontal member,
        said pair of vertically disposed side members, said base member, and said horizontal member of said at least one movable leaf structure including at least a first wall including securement formations comprising:
            a pair of lateral hooks and a central dovetail formation for securing a respective longitudinal angle profile;
        a first glass casing member configured to be disposed as part of a casing for a glass pane in said frame of said side piece structure and in said frame of said at least one movable leaf structure; and
        a second glass casing member configured to provide part of a casing for a glass pane said second glass casing member being configured to be in a secured position with: said pair of vertically disposed side members, said top member, and said base member of said side piece structure, and with; said pair of vertically disposed side members, said horizontal member, and said base member of said at least one movable leaf structure.

2. The frame profile system according to claim 1 wherein one of said pair of interlocking profiles is secured to said support profile of said at least one movable leaf structure, and the other one of said pair of interlocking profiles is secured to said horizontal member of said at least one movable leaf structure,
    said pair of interlocking profiles being disposed in substantially centrically symmetrical manner with respect to one another.

3. The frame profile system according to claim 1 and further comprising:
    for at least one of: said side piece structure and said at least one movable leaf structure,
    an intermediate profile member configured to provide a central, horizontal portion of the selected structure, said intermediate member when viewed in transverse cross section having a substantially uniform cross section and including:
        a forwardly directed wall,
        a rearwardly directed wall remote from said forwardly directed wall,
        an upper securement wall disposed at right angles between said forwardly directed wall and said rearwardly directed wall, and
        a lower securement wall remote from said upper securement wall and disposed at right angles between said forwardly directed wall and said rearwardly directed wall,
        said upper and lower securement walls including securement formations comprising:
            a pair of lateral hooks and a central dovetail formation for securing said first and second glass casing members; and
    a profile connector element configured to be connected at least at abutting portions of said intermediate profile member with at least one vertical side member of: said side piece structure and said at least one movable leaf structure, by being insertable and fastened in friction-tight manner into said securement formation of the selected member,
    said profile connector element when viewed in transverse cross section having a substantially uniform cross section and including:
        a front wall,
        a base wall remote from said front wall of said profile connector element,
        a first side wall disposed at right angles between said front wall and said base wall of said profile connector element, a second side wall remote from said first side wall and disposed at right angles between said front wall and said base wall of said profile connector element, a tubular pin receptacle realized symmetrically and in the center on said surface of said front wall which is facing said base wall of said profile connector element, said base wall having a T-shaped channel formation in its outer surface, and groove formations in said first and second side walls of said profile connector element.

4. The frame profile system according to claim 3 wherein said base wall of said profile connector element comprises at least one of: threaded borings and offset borings, and said front wall of said profile connector element comprises openings aligned with said threaded borings in said base wall, for securing said profile connector element at least with a selected profile member by way of threaded stems in aligned fastening openings of the selected profile member.

5. The frame profile system according to claim 3 wherein said base member of said side piece structure includes at least a portion configured as attachment formation for a respective floor profile member, said side piece structure being configured by said top member, said base member, and said intermediate profile member being joined in abutting relationship with at least one profile connector between said pair of vertically disposed side members of said side structure, and further comprising:

a floor profile member and configured to be secured to the ground and to said attachment formation of said base member of side piece structure, said floor profile member when viewed in transverse cross section having a substantially uniform cross section and including:

a base wall, said base wall comprising an installation plate configured to be secured with fasteners such as screws to the ground, a ceiling wall remote from said base wall and configured to be secured to said attachment formation of said base member, a side wall disposed at right angles between said base wall and said ceiling wall, and a lateral surface-providing wall at said ceiling wall and remote from said side wall and being configured to be aligned with said attachment formation of said base member of said side piece structure.

6. The frame profile system according to claim 5 and comprising:

a rounded profile member, said rounded profile member being configured to provide at least one vertical side member of said frame of said side piece structure, said rounded profile member when viewed in transverse cross section having a substantially uniform cross section and including:

a front wall, a back wall remote from said front wall, a rounded seal wall disposed at right angles between said front wall and said back wall, said rounded seal wall including lateral receptacle formations for at least one seal, a securement wall remote from said rounded seal wall and disposed at right angles between said front wall and said back wall of said rounded profile member, said securement wall having securement formations comprising:

a pair of lateral hooks and a central dovetail formation for securing at least said first and second glass casing members, and a central inner profile portion for a respective pivot shaft, said central inner profile portion being configured to be removably secured in said rounded profile member.

7. The frame profile system according to claim 3 wherein said at least one movable leaf structure is configured by at least said horizontal members said intermediate profile member, and said base member of said at least one leaf structure being joined with at least one profile connector element in abutting relationship between said pair of vertically disposed side members of said at least one movable leaf structure, and further comprising:

a longitudinal angle profile configured to be disposed in secured relationship at said base member of said at least one movable leaf structure, said longitudinal angle profile including at least one receptacle formation for at least one ground-engaging seal.

8. The frame profile system according to claim 7 wherein said leaf structure includes a floor guide comprised of:

a mounting bracket secured adjacent to said access formation of said base member of said at least one movable leaf structure, and a roller secured to said mounting bracket for guiding said at least one movable leaf structure in reference to said side piece structure.

9. The frame profile system according to claim 7 wherein at least one vertical side member includes at least one profile wall for securement thereat of a separate profile with at least one receptacle formation for at least one seal.

10. The frame profile system according to claim 7 and further comprising:

a pivot mounting configured to be located in at least one vertical side member of said at least one movable leaf structure and said support profile of said at least one movable leaf structure, said pivot mounting being configured to allow pivoting movement of said at least one movable leaf structure in reference to said side piece structure, said pivot mounting including:

a support arm configured to be disposed in such a manner that is its being restrained in the selected side member, said support arm having a hub portion and a free end remote from said hub portion, and said support arm tapering in thickness from said hub portion to said free end, a bearing bush adapted to be secured in said hub portion of said support arm, and a shaft of substantially uniform cross section, said shaft being configured to be secured in form-fitting manner in said side member, said shaft being locatable so that it can rotate in said bearing bush, said shaft being located directly and non-rotationally in said side member, and said shaft comprising an upper terminus, a lower terminus remote from said upper terminus, a groove formation in said upper terminus, and transverse penetrating threaded borings in said lower terminus, and said shaft being adapted to be fastened in the selected side member by screws locatable in aligned borings of said side member and said threaded borings of said shaft, a retaining ring adapted to be secured in said groove formation of said shaft, a ring-shaped disc adapted to be located between said retaining ring and said hub portion of said support arm, and adjusting apparatus locatable beneath said free end of said support arm.

11. The frame profile system according to claim 10 wherein said adjustment apparatus comprises:

at least one set screw configured and disposed to adjust said free end of said support arm of said pivot mounting.

12. The frame profile system according to claim 10 wherein said support arm is rigidly or non-rigidly located in said support profile of said at least one movable leaf structure.

13. The frame profile system according to claim 10 wherein said support arm is comprised of gray cast iron containing graphite, and said shaft has a substantially constant cross section and is not machined.

14. An assembly device for use with the frame profile system according to claim 4 for securing at least said intermediate profile member and at least one vertical side member with said profile connector element, said assembly device being configured to be operatively placed in a form-fitting manner in the respective securement formations of at least one of: said intermediate profile member and at least one of said vertical side members of said at least one movable leaf structure, said assembly device comprising:

a first portion, said first portion having a first terminus and a second terminus remote from said first terminus, said second terminus of said first portion having a hook formation adapted to be inserted into at least one forzation of said intermediate profile member, a second portion, said second portion having a first terminus and a second terminus remote from said first terminus, said second terminus of said second portion having a hook formation adapted to be inserted into at least one securement formation of said intermediate profile member, and spring apparatus configured and disposed to bias said first and second portions of said assembly device with respect to one another, said second portion of said assembly device having a guide portion, a longitudinal guide formation in said guide portion, said longitudinal guide formation having at least one abutment edge formation; and a threaded bolt element configured to act as a striking bolt and be displaced in said longitudinal guide formation to drive a steel pin through a bore formation in at least said intermediate profile member and in reference to said at least one abutment edge formation.

15. A method of fastening said profile connector element as claimed in claim 3 adjacent to a vertical side member of at least one of: said side piece structure and said at least one movable leaf structure, said method including the steps of:

(a) inserting said profile connector element with its base wall into the securement formation of said intermediate profile member;

(b) positioning said profile connector element in said intermediate profile member;

(c) centering said profile connector element with set screws which are screwed against a notch of said securement formation of the selected vertical side member;

(d) securing said profile connector element by fastening it with at least one material-displacing threaded stem to a profile wall of the selected vertical side member;

(e) introducing the selected vertical side member by pushing it onto said profile connector element; and (f) fastening said intermediate profile member to said profile connector element by means of steel pine that are pressed by means of said assembly device through holes in a respective profile wall of said intermediate profile member into said tubular pin receptacle of said profile connector element.

16. The method of claim 15 and further including the steps of:

(g) inserting at least one of said first glass casing members into said securement formation of said intermediate profile member;

(h) placing at least one glass pane in contact with said first side wall of the selected first glass casing member;

(i) positioning a glass seal between said at least one glass pane and said first side wall of the selected first glass casing member; and (j) securing said at least one glass pane by buttoning a selected second glass casing member into place.

\* \* \* \* \*

UNITED STATES PATENT AND TRADEMARK OFFICE
CERTIFICATE OF CORRECTION

PATENT NO.   : 6,338,227 B1
DATED        : January 15, 2002
INVENTOR(S)  : Andreas Finke It is certified that error appears in the above-identified patent and that said Letters Patent is hereby corrected as shown below:

<u>Column 20,</u>
Line 10, after 'horizontal', delete "members" and insert -- member, --.

<u>Column 21,</u>
Line 35, before 'of', delete "forzation" and insert -- formation --.

<u>Column 22,</u>
Line 28, after 'steel', delete "pine" and insert -- pins --.

Signed and Sealed this

Fifteenth Day of October, 2002

*Attest:*

JAMES E. ROGAN
*Director of the United States Patent and Trademark Office*

*Attesting Officer*